(12) United States Patent
Brattesani

(10) Patent No.: US 6,926,532 B1
(45) Date of Patent: Aug. 9, 2005

(54) POD APPARATUS FOR EDUCATION AND AMUSEMENT

(76) Inventor: Steven J. Brattesani, 3309 Fillmore St., San Francisco, CA (US) 94123

(*) Notice: Subject to any disclaimer, the term of this patent is extended or adjusted under 35 U.S.C. 154(b) by 3 days.

(21) Appl. No.: 10/236,021

(22) Filed: Sep. 4, 2002

Related U.S. Application Data

(60) Provisional application No. 60/317,730, filed on Sep. 5, 2001.

(51) Int. Cl.$^7$ .............................................. G09B 23/28
(52) U.S. Cl. ...................................... 434/263; 434/264
(58) Field of Search ............................... 434/263–264, 434/266; 433/215, 216; 15/105, 167.1

(56) References Cited

U.S. PATENT DOCUMENTS

| | | | |
|---|---|---|---|
| 3,309,274 A | | 3/1967 | Brilliant |
| 3,828,770 A | * | 8/1974 | Kuris et al. ................. 601/142 |
| 4,102,047 A | * | 7/1978 | Walker ........................ 434/263 |
| 4,221,060 A | * | 9/1980 | Moskowitz et al. ........ 434/264 |
| 4,253,212 A | * | 3/1981 | Fujita ......................... 15/167.1 |
| 4,435,163 A | * | 3/1984 | Schmitt et al. ............. 434/263 |
| 4,770,637 A | * | 9/1988 | Harrell, Jr. .................. 434/263 |
| 4,812,127 A | * | 3/1989 | Hernandez .................. 434/264 |
| 4,934,940 A | * | 6/1990 | Savery ........................ 434/263 |
| 5,232,370 A | * | 8/1993 | Hoye .......................... 434/263 |
| 5,673,451 A | * | 10/1997 | Moore et al. ................ 15/105 |
| 6,536,068 B1 | * | 3/2003 | Yang et al. .................. 15/105 |

* cited by examiner

*Primary Examiner*—Jacob K. Ackun
*Assistant Examiner*—J. Williams
(74) *Attorney, Agent, or Firm*—John P. O'Banion

(57) ABSTRACT

A demonstration pod and method for demonstrating dental situation and procedures. By way of example, a Sonipod demonstrates the effectiveness of an electric toothbrush and provides for educating a dental patient on proper brushing techniques to promote healthy oral hygiene. The instructional display includes a simulated tooth and gum assembly within a partially liquid filled chamber. High frequency brush movements create cavitations in the liquid of the chamber. The display also preferably includes a plurality of oscillating light emitters and an oscillating circuit that pulses at a range of frequencies to match and compare the frequency of brush head movements for different models of electric toothbrushes. Additional demonstration pod units are also described for non-dental purposes, in particular for comforting a baby, providing a light for a child, and entertaining a child.

99 Claims, 23 Drawing Sheets

POD APPARATUS FOR EDUCATION AND AMUSEMENT

CROSS-REFERENCE TO RELATED APPLICATIONS

This application claims priority from U.S. provisional application Ser. No. 60/317,730 filed on Sep. 5, 2001, incorporated herein by reference.

STATEMENT REGARDING FEDERALLY SPONSORED RESEARCH OR DEVELOPMENT

Not Applicable.

REFERENCE TO A COMPUTER PROGRAM APPENDIX

Not Applicable.

BACKGROUND OF THE INVENTION

1. Field of the Invention

This invention pertains generally to electric toothbrushes and instructional displays, and more particularly to an apparatus for demonstrating the effectiveness of an electric toothbrush, and dental procedures in general. The invention also pertains to an apparatus which is reconfigurable or which can be constructed for a variety of educational and amusement applications.

2. Description of the Background Art

Numerous situations arise in which dental practitioners are called to demonstrate dental concepts and procedures to their patients. For example, understanding a procedure before it is performed can help a patient reach a decisions and/or provide comfort to that patient. Instruction can also motivate and condition a patient to properly care for their teeth. One important aspect of proper dental hygiene being brushing.

Proper teeth brushing is an essential component of healthy oral hygiene. A major cause of the development of cavities is the presence of dental plaque. Plaque is systematically formed on tooth surfaces between brushings. If tooth brushings are inadequate, dental plaque can accumulate on tooth surfaces as well as within interdental spaces. Such accumulations of plaque from inadequate brushing can lead to bacterial growth that may form acids that destroy the protective enamel of the teeth thereby forming cavities. Improper oral hygiene is also a contributing factor in the development of many periodontal diseases. Accordingly, the proper brush stroke technique, duration and location of tooth brushing efforts are important in the maintenance of good oral hygiene.

Many children and adults have not received adequate instruction concerning the proper techniques and duration of tooth brushing so as to properly eliminate plaque from tooth surfaces during each brushing session. Common brushing problems include the placement of the brush head on the tooth and gum surfaces and performing the brushing for a proper duration. In particular, many people spend an insufficient amount of time brushing lingual or palatal surfaces of the teeth and focus mainly on the facial surfaces. In addition, the incisors and canines often receive more attention than the molars and bicuspids.

Advancements in toothbrush design have included several electrical toothbrush designs that provide improved plaque removal capabilities in relation to a manual toothbrush. Electric toothbrushes typically have a toothbrush head that is oscillated in a narrow range of motion. Electric toothbrushes known in the art generally have a bristled brush configured for moving horizontally, vertically or rotationally. A number of electric toothbrushes are driven ultrasonically to provide oscillations at a very high frequency and these toothbrushes have been proven to be very effective in loosening and dissipating plaque near the gum line.

Instruction on tooth brushing technique and duration has been generally lacking, wherein the task of providing instruction concerning dental hygiene has been relegated by default to dental practitioners. Dentists typically rely on verbal communications for instructing patients, as there exist few instructional display devices in the art that can assist the dentist in educating adults and children in proper brushing technique, dental situations and dental procedures which lead to proper oral hygiene. Likewise, a dearth of display devices exist that can illustrate the effectiveness of different types of electric toothbrushes. It should be recognized that training by means of verbal discourse has been found far less effective than training which includes a combination or hearing, seeing, and doing.

Accordingly, a need exists for instructional dental displays, such as those that can efficiently illustrate the effectiveness of different types of electric toothbrushes. These instructional dental displays provide a framework for patient instruction, and illustrate other aspects relating to dental hygiene and dental procedures. The present invention satisfies those needs, as well as others, and generally overcomes the deficiencies found in existing equipment.

BRIEF SUMMARY OF THE INVENTION

The present invention provides instructional display embodiments for providing visual demonstrations, in particular for use in educating dental patients. A number of embodiments are described which incorporate some aspect of dental hygiene or dental procedures associated with a simulated dental structure. Additionally, the concept of the invention includes additional embodiments for non-dental applications. The units are generally referred to herein as "pods" in deference to their shape and generally self-contained nature.

A first embodiment of the invention provides for demonstrating the action of an electric toothbrush during brushing. This embodiment is generally referred to herein as a Sonipod™. By way of example, and not of limitation, one aspect of the invention includes a simulated tooth and gum assembly within a liquid filled chamber held in a housing. The liquid in the chamber is preferably water or mineral oil with a coloring added, and optionally an antibacterial agent to keep the liquid clear over time. Furthermore, strobe lighting may be incorporated into the unit so that the brush head motion and speed may be more readily viewed and appreciated by the patient.

Utilizing this Sonipod embodiment, a dental practitioner can demonstrate the proper use of the electric toothbrush near the surfaces of the simulated tooth and gum within the unit. Furthermore, the practitioner can demonstrate the relative efficacy of an electric toothbrush by showing cavitations within the liquid of the chamber when the toothbrush is brought into contact with the chamber. Cavitation of the liquid within the chamber provide a visual illustration of the ability of the toothbrush to dislodge and dissipate plaque during brushing. A high frequency electric toothbrush, such as a "sonic toothbrush" will generate cavitation of the liquid while a lower frequency toothbrush will not cause cavitation. It should be appreciated that toothbrushes operating at a lower frequency have been found to be less effective at fighting plaque. The present invention beneficially provides visual evidence to help convince a patient to invest in a more effective toothbrush if they have not already done so. Thus, the dental practitioner can visually illustrate the proper placement of the brush head in relation to the tooth and gums to maximize brushing effectiveness.

Additionally, a plurality of light emitters, configured to oscillate at a range of frequencies, are preferably located at the front of the device for stroboscopically highlighting the motion of a toothbrush. An electric toothbrush is activated and placed in the light produced by the light emitters, wherein by varying the frequency of the strobing light the head of the electric toothbrush can be made to appear stationary. The oscillation frequency of other electric toothbrushes can then be compared with the first electric toothbrush or with a preset frequency of oscillations. The dental practitioner can provide instruction concerning the mechanics of brushing and plaque disruption as well as assessing the relative plaque-fighting efficiency of various electric toothbrushes.

In alternative embodiments, the color of the light produced by the light emitters may be selected from a variety of colors including ultraviolet light that may provide illumination of the display that is different than illumination produced by visible light. Similarly, the color of the liquid surrounding the gums of the tooth and gum assembly may be clear or may be colored to aid in visualizing cavitation. It should also be appreciated that the placement of the oscillating strobe lights for illuminating the dental surfaces and/or toothbrush may be varied without departing from the invention taught herein.

Additional embodiments of the invention provide a demonstration unit for a number of additional dental related situations, including but not limited to: educating patients as to what cavities are and how they are repaired, illustrating a root canal procedure, illustrating the dental implant procedure, illustrating dental procedures relating to different groups of teeth, procedures for taking dental impressions, illustrating the use of x-ray images, procedures for cleaning calculus, and for demonstrating other dental care situations and procedures. Alternative embodiments of the apparatus may also be directed to non-dental purposes; for example a device for comforting a crying baby, a night light, a toy character pod, and other similar pods such as may function as learning aids and/or provide entertainment that may include sound effects, timers, light activities and so forth.

An object of the invention is to provide embodiments of instructional display apparatus that can be utilized for demonstrating a number of dental care situations and procedures.

Another object of the invention is to provide an instructional display apparatus that may be utilized for educating dental patients to improve dental hygiene and to educate them about different procedures.

Another object of the invention is to provide an instructional display apparatus that can visually compare the frequencies of various electric toothbrushes.

Another object of the invention is to provide an instructional display that can visually illustrate the presence and effective range of plaque dispersing waves by showing cavitation in a liquid surrounding a tooth and gum assembly.

Another object of the present invention is to provide a model for instruction of a patient by a dental practitioner of the proper technique and duration of tooth brushing when utilizing an electric toothbrush.

Another object of the invention is to provide an instructional display apparatus that can help patients in understanding how cavities are filled.

Another object of the invention is to provide an instructional display apparatus that can illustrate a root canal procedure.

Another object of the invention is to provide an instructional display apparatus that can illustrate the dental implant procedure.

Another object of the invention is to provide an instructional display apparatus that can illustrate dental procedures relating to different groups of teeth.

Another object of the invention is to provide an instructional display apparatus that can illustrate the procedure for taking a dental impression.

Another object of the invention is to provide an instructional display apparatus that can illustrate the use of x-ray images.

Another object of the invention is to provide an instructional display apparatus that can demonstrate the procedure for cleaning dental calculus.

Another object of the invention is to provide an instructional display apparatus for demonstrating additional dental care situations and procedures in general.

Another object of the invention is to provide a pod apparatus that can provide automated lighting and sound effects, such as associated with assorted care situations.

Another object of the invention is to provide a display apparatus that can provide educational and entertainment value as a toy.

Another object of the invention is to provide an instructional apparatus that is easy to use and is self contained.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings that are for illustrative purposes only.

DETAILED DESCRIPTION OF THE INVENTION

Referring more specifically to the drawings, for illustrative purposes the present invention is embodied in the apparatus generally shown in FIG. 1 through FIG. 23. It will be appreciated that the apparatus may vary as to configuration and as to details of the parts, and that the method may vary as to the specific steps and sequence, without departing from the basic concepts as disclosed herein.

Figure 1:
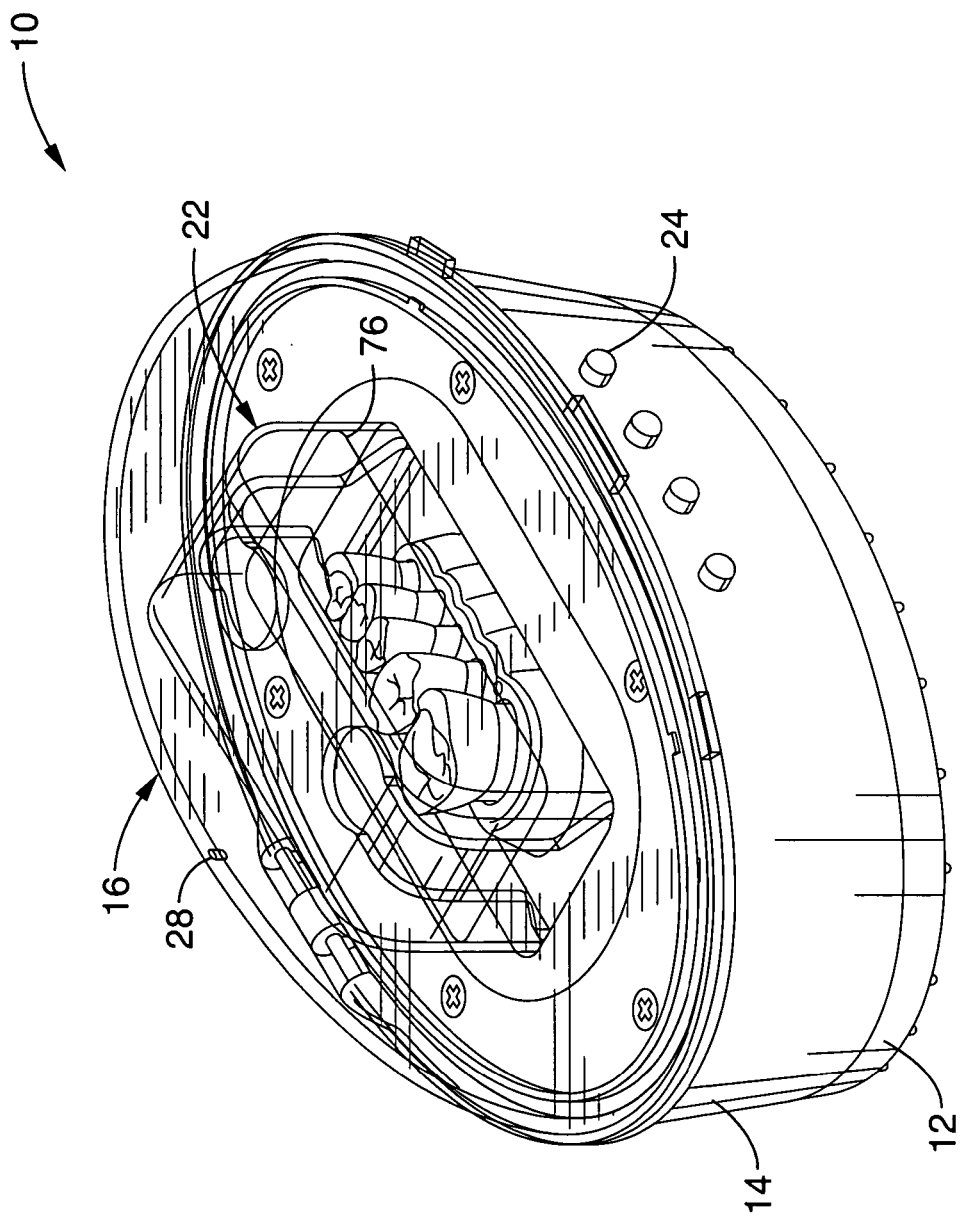
FIG. 1 is an assembled view of an embodiment of a Sonipod apparatus according to the present invention shown with the cover in the closed position.
Figure 2:
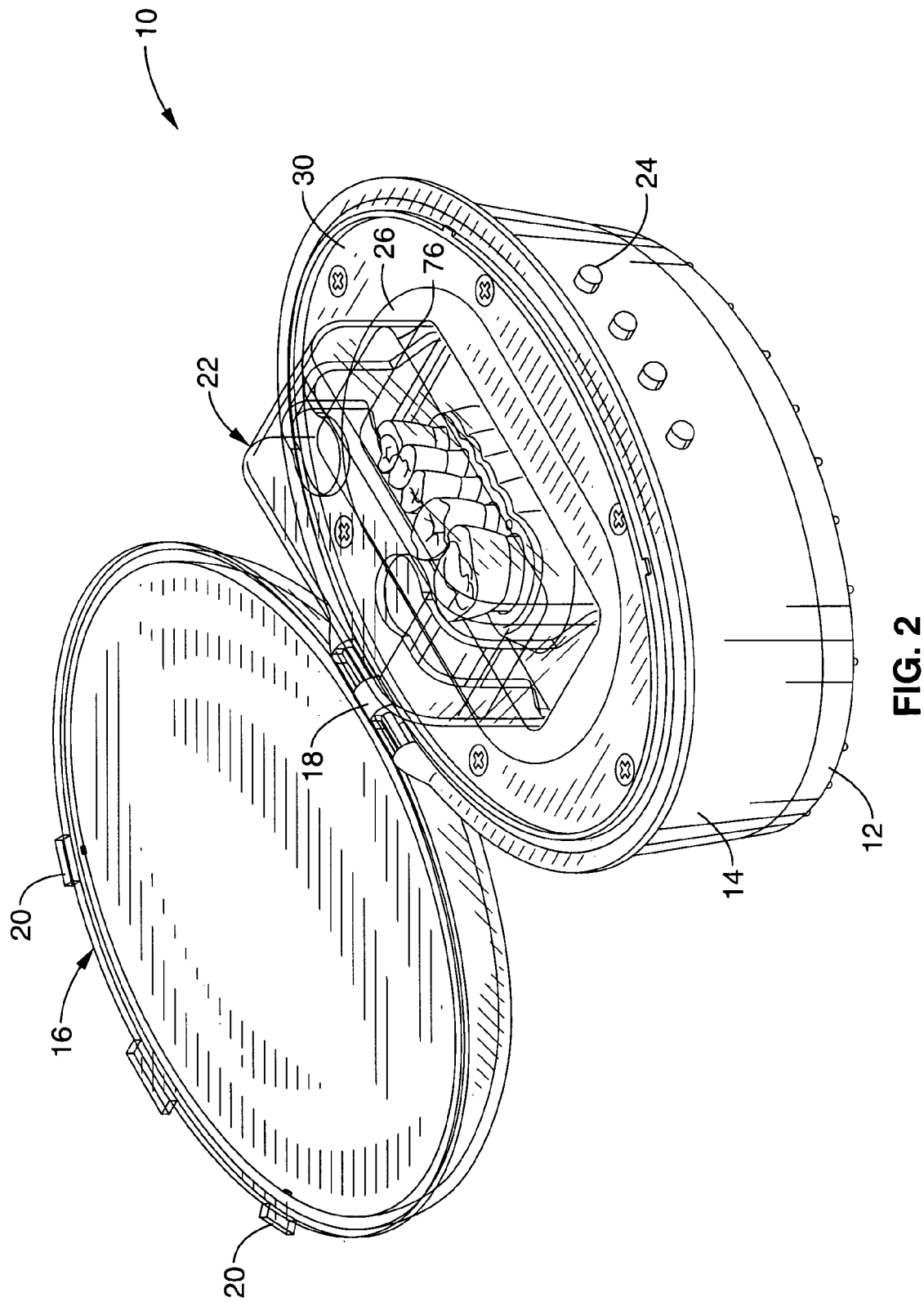
FIG. 2 is an assembled view of the apparatus of FIG. 1 shown with the cover in an open position.
Figure 8:
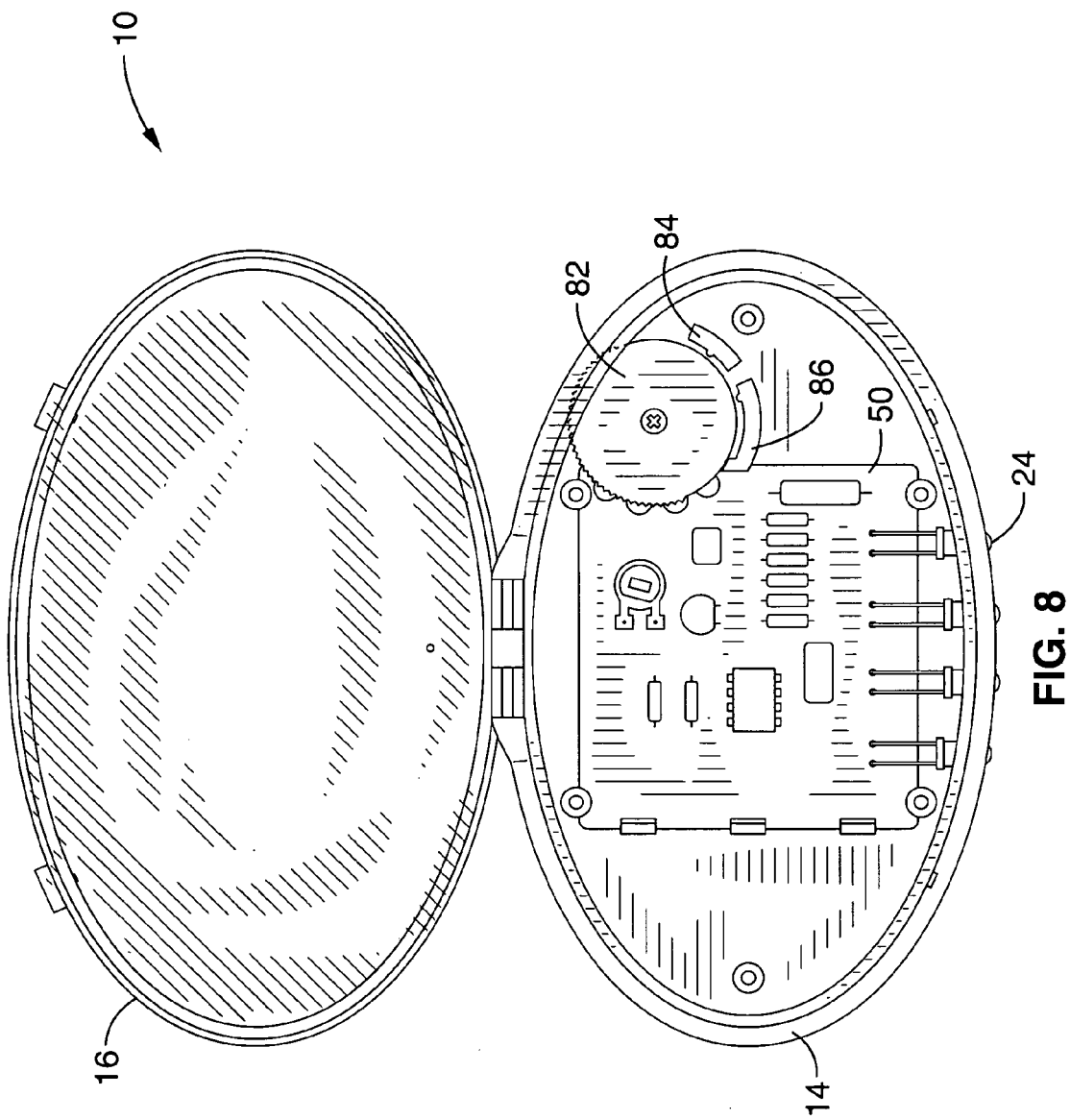
FIG. 8 is a top plan view of the apparatus of FIG. 1 with the cover open and the tooth chamber and related support removed to show the circuit board retained within the housing.
Figure 9A:
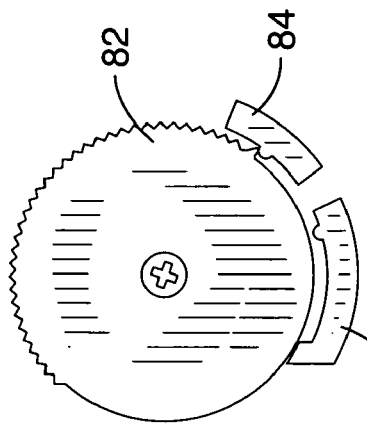
FIG. 9A through FIG. 9D are diagrammatic views of the frequency control input in the off, on, middle, and high frequency range setting positions, respectively.
Figure 9B:
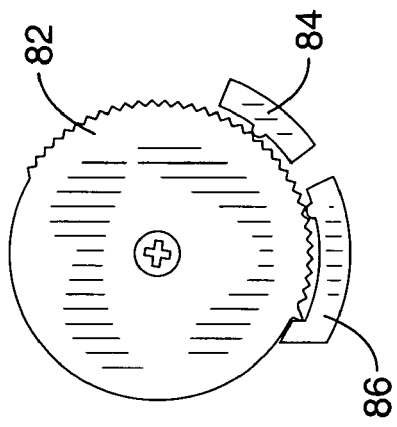
Figure 9C:
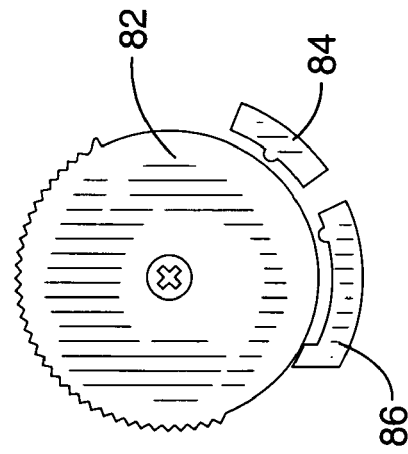
Figure 9D:
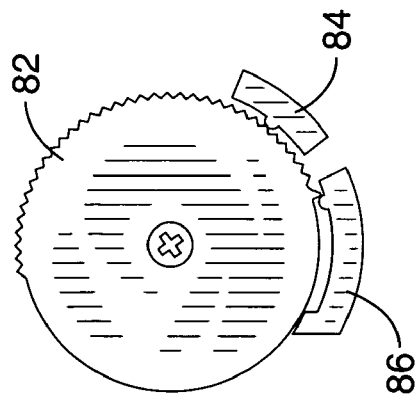

FIG. 1 though FIG. 9D depict a dental demonstration apparatus 10 according to the present invention. FIG. 1 through FIG. 2 depict an assembled version of the apparatus shown in a closed and open position respectively, while FIG. 3 through FIG. 9D illustrate utilization, exploded views, and details.

Referring first to FIG. 1 and FIG. 2, a dental demonstration apparatus 10 having a simulated dental structure which depicts simulated biting surfaces representing natural teeth, dental implants, and/or dental appliances adapted for demonstrating particular dental care situations and procedures. The apparatus includes a base 12, preferably constructed from a non-slip material (i.e. rubber, silicone, latex, and so forth), a housing 14, and a cover 16. Housing 14 is preferably joined to cover 16 by hinges 18 which allow the cover to be moved between a closed position as shown in FIG. 1 and an open position as shown in FIG. 2. The apparatus is shown in a preferred oval-shaped configuration which provides a large percentage of usable interior space and a comfortable exterior shape for being securely held within the hand of a dental practitioner or patient during a demonstration. A snap-type latch 20 is also preferably provided to secure cover 16 in the closed position. In the preferred embodiment, cover 16 is transparent, or semi-transparent, ensuring visibility of a chambered tooth assembly 22 with a simulated dental structure even with the lid closed. It is preferable that at least portions of cover 16 be transparent or semi-transparent wherein a view is provided through the cover so that a desired type of demonstration unit may be readily selected from a plurality of similar units. Alternatively, cover 16 may be fabricated from non-transparent, opaque, materials if the unit is provided with sufficient identifying labels or means for external characterization of the pod.

A plurality of light emitters 24 protrude slightly from the front of housing 14, although the light emitters may be additionally or alternatively placed in other positions. While four light emitters are shown, the exact number and position can vary as a matter of design choice. The light emitters are preferably implemented as light emitting diodes or the like.

To compare the relative effectiveness of different electric toothbrushes, the head of a first electric toothbrush may be held within the field of light generated by light emitters 24, and the frequency of the strobe light output adjusted until the brush head appears to be motionless. Other brands or models of electric toothbrush may then be held within the field of the strobe light from light emitters 24 to roughly compare operating frequency. The frequency of the strobing emanating from the unit may then be adjusted up or down as desired to match the operating frequency of other electric toothbrush units.

The apparatus is preferably manufactured from polymeric materials such as typical plastics utilized within the injection molding process. It will be recognized that base 12, housing 14 and cover 16 may be fabricated from variously colored materials to enhance the aesthetic characteristics of the apparatus. At least one aperture 28 is preferably provided through cover 16 so that air can safely pass from the outside of the cover to the inside of cover 16.

Figure 3:
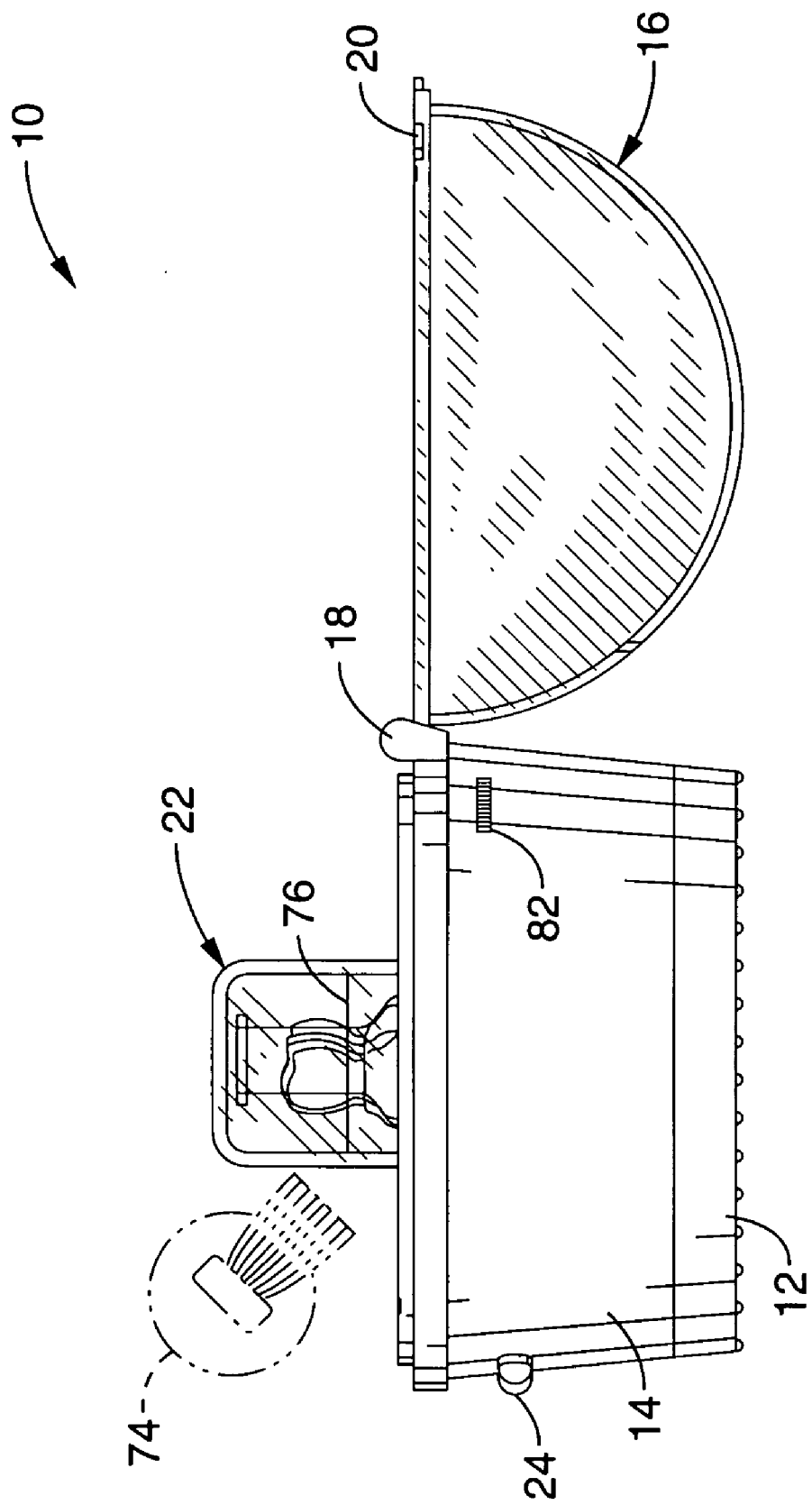
FIG. 3 is a side elevation view of the apparatus of FIG. 1 shown with the cover in the open position and a toothbrush head positioned adjacent to the tooth chamber.

FIG. 3 illustrates one demonstration aspect of the present invention. An electric toothbrush 74 is being tested by placing the operating brush head of the toothbrush in contact with the chambered tooth assembly 22 to demonstrate cavitation, standing waves, foaming, and other visible activity. Chambered tooth assembly 22 is preferably partially filled with a liquid 76, such as mineral oil or water having an anti-bacterial additive to maintain clarity. Liquid 76 may also include a color additive to provide contrast to improve visualization effectiveness.

Aided by the Sonipod demonstration unit, a dental practitioner can demonstrate the proper use of the electric toothbrush 74 on the surfaces of the tooth and gum assembly 58 and demonstrate the relative efficacy of an electric toothbrush 74. The unit can illustrate cavitation, standing waves, sparkles, swirls, and bubbling in response to simulated "brushing" of the encapsulated teeth within chambered tooth assembly 22 by an electric toothbrush head.

These hygienic brushing effects are demonstrated within liquid 76 of chambered tooth assembly 22 when the brush is brought into contact with chambered tooth assembly 22. For example, cavitation provides a visual illustration of the effect of the brushing on plaque and the ability of brush 74 to dislodge and dissipate plaque when proper brushing procedures are followed. Cavitation is most pronounced when utilizing a high frequency toothbrush 74. The use of high frequency ultrasonic toothbrushes has been found to be more effective at removing plaque when compared with toothbrushes operating at lower frequencies. The Sonipod unit therefore allows the dental practitioner to visually demonstrate the proper placement of the brush head to the tooth and gums to maximize brushing effectiveness by the patient. It also provides encouragement for the patient to invest in more effective brushing equipment.

Figure 4:
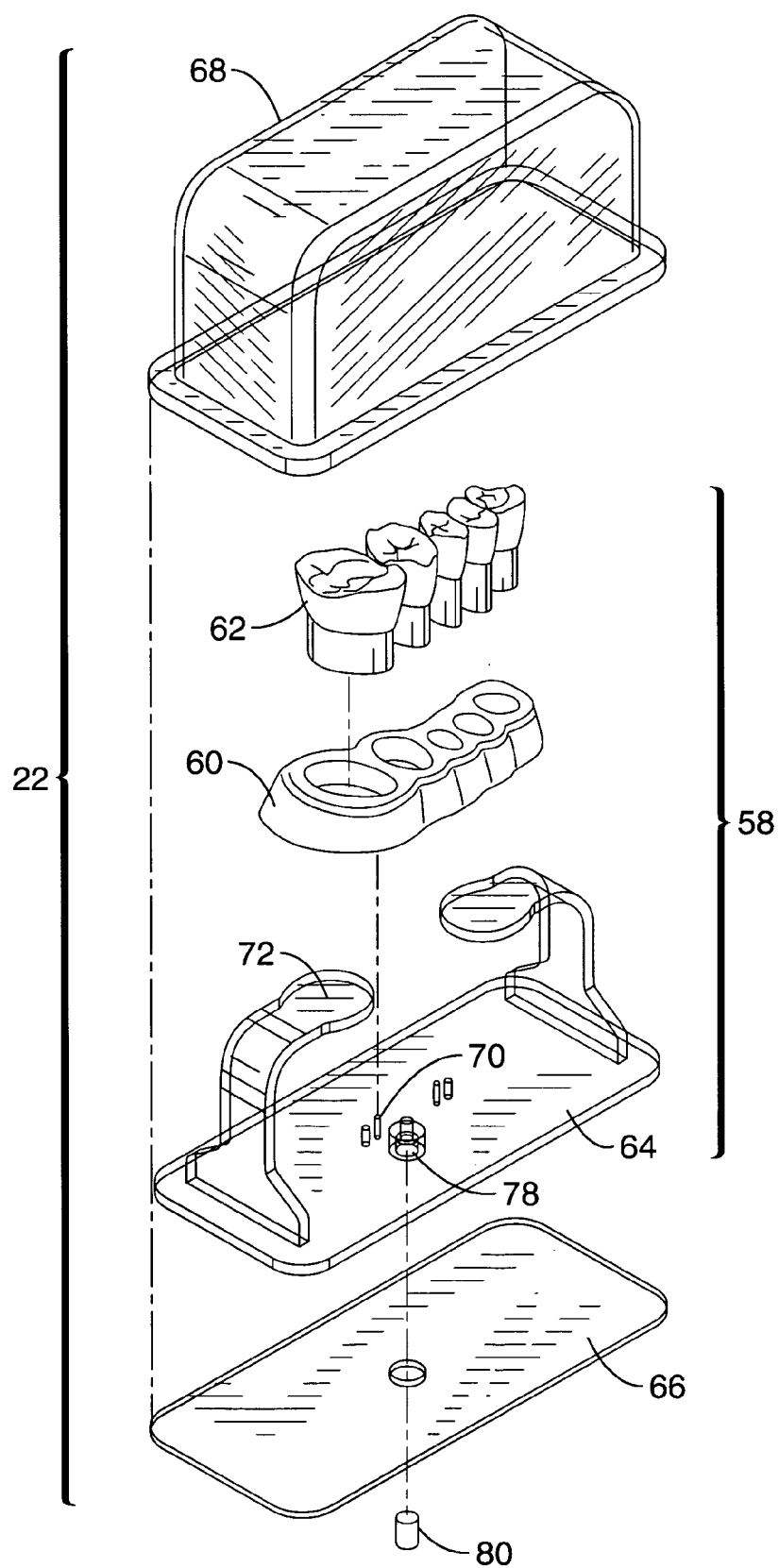
FIG. 4 is an exploded view of the tooth chamber portion of the apparatus shown in FIG. 1.

FIG. 4 depicts chambered tooth assembly 22 within which a simulated dental structure, such as tooth and gum assembly 58 is retained. Tooth and gum assembly 58 simulates a set of gums 60 that retain a set of simulated teeth 62, such as rear molars, that are fastened to a plate 64. It will be appreciated that at least a small portion of the roots extend from simulated teeth 62, and alternatively the entire root may be shown extending into a simulated jaw member (not shown). Panel 66 is coupled with tooth chamber cover 68 to form chambered tooth assembly 22. In the embodiment shown, the simulated teeth 62 and simulated gums 60 are mounted to pins 70 on plate 64 that fit in corresponding holes (not shown) in teeth 62 and gums 60. The teeth 62 and gums 60 are preferably glued to pins 70. Plate 64 preferably has one or more chamber supports 72 to maintain the dimensions of the chambered tooth assembly 22 in the embodiment shown.

Chambered tooth assembly 22 is preferably partially filled with liquid 76 through port 78 in the base of chambered tooth assembly 22. It is preferred that the level of liquid 76 be approximately at the gum line of the display. Port 78 is sealed with a plug 80 so that liquid 76 is prevented from leaking from chambered tooth assembly 22.

Figure 5:
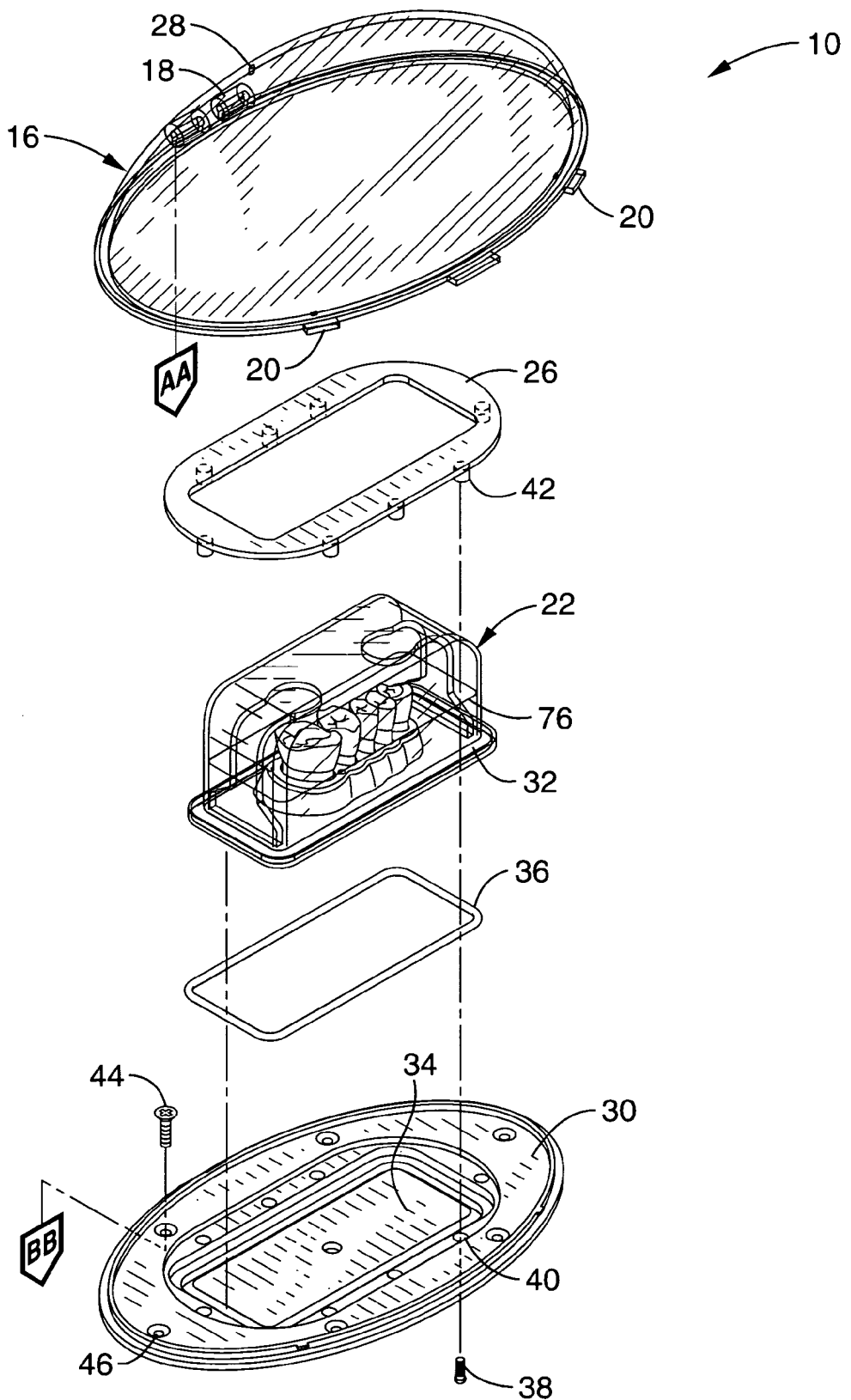
FIG. 5 is an exploded view of the upper portion of the apparatus shown in FIG. 1.
Figure 6:
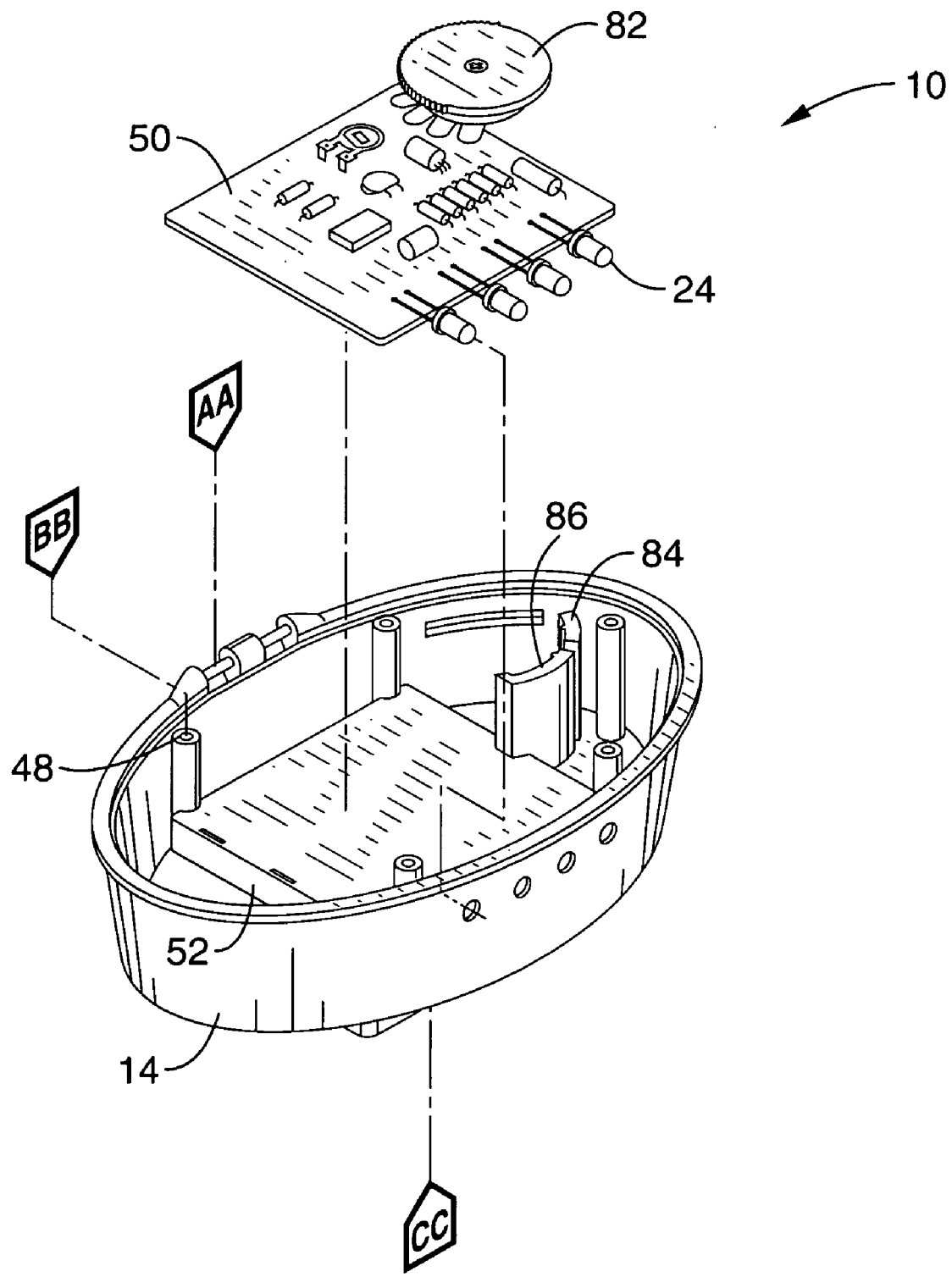
FIG. 6 is an exploded view of the lower portion of the apparatus shown in FIG. 1.
Figure 7:
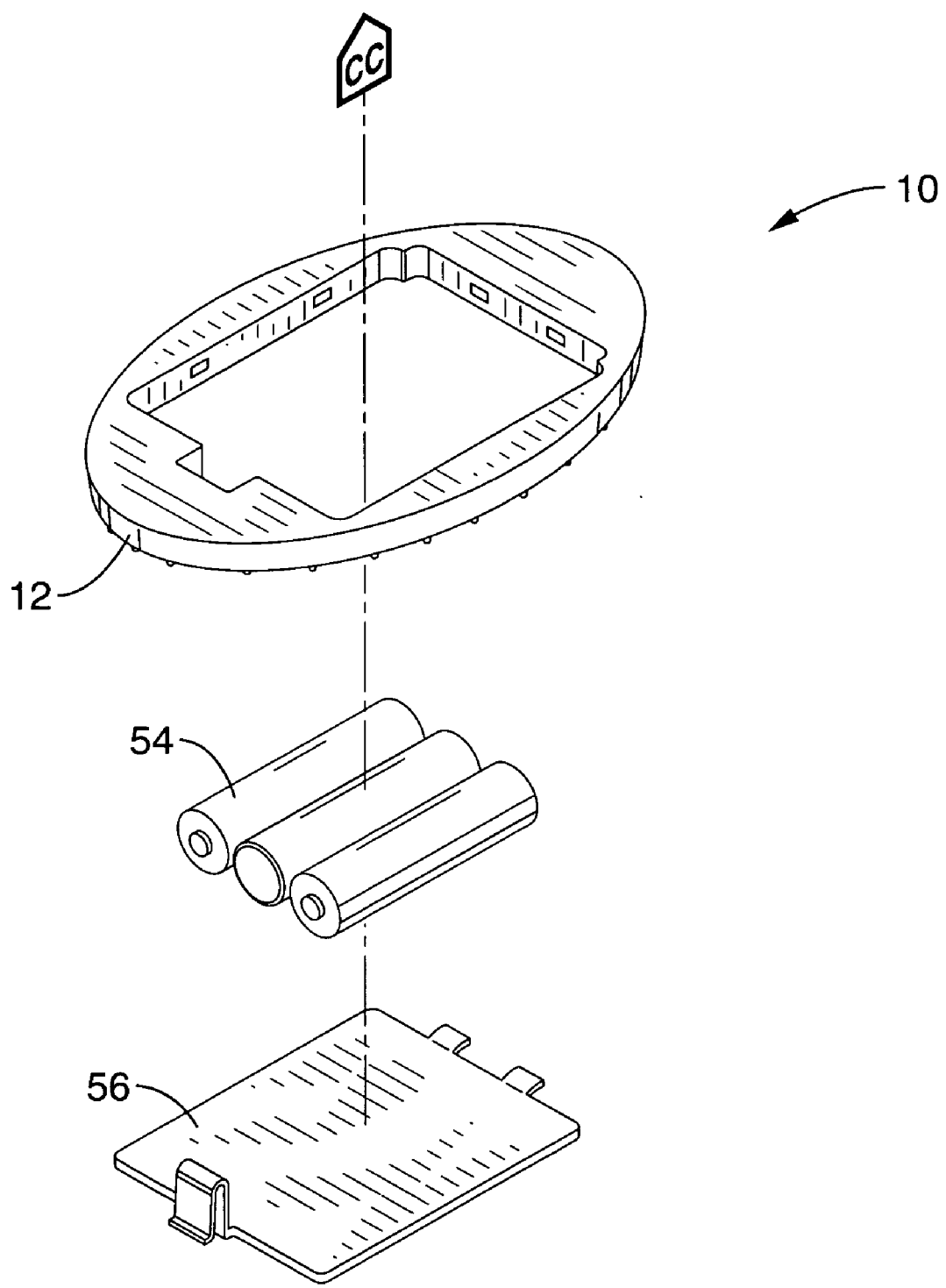
FIG. 7 is an exploded view of a battery retention portion of the apparatus shown in FIG. 1.

FIG. 5 through FIG. 7 depict an exploded view of the demonstration unit depicted in FIG. 1 through FIG. 3, and is shown in three parts comprising upper portion, lower portion, and battery retention base portion. It should be recognized that the construction details are provided by way of example, and not by way of limitation, wherein a person of ordinary skill in the art may construct the unit following a number of conventional construction techniques in various shapes and sizes without departing from the teachings of the present invention.

Referring first to FIG. 5, a transparent chambered tooth assembly 22 is secured to platform 30 by the engagement of a peripheral lip 32 by upper tray 26. Chambered tooth assembly 22 and tray 26 fit in a recess 34 in platform 30. In the embodiment shown, a gasket 36 is disposed in recess 34 and chambered tooth assembly 22 is positioned over gasket 36 in recess 34. Tray 26 is placed over chambered tooth assembly 22 along with gasket 36, and secured in position with a plurality of retaining screws 38 inserted through holes 40 in platform 30 and received in mounting pillars 42 of tray 26.

Platform 30 with tray 26 and chambered tooth assembly 22, are positioned and secured to housing 14 with platform screws 44 disposed in holes 46 in platform 30. It can be seen that the chambered tooth assembly 22 can be easily exchanged with a replacement chamber by removal of platform screws 44 and tray screws 38.

Referring now to FIG. 6 it is seen that housing 14 is adapted for the attachment of a mating hinge portion which may be provided as an adaptation of cover 16. Also it should be noted that receptacles 48 in housing 14 are adapted for receiving screws 44 to connect platform 30 and chambered tooth assembly 22 to housing 14. Circuitry is attached to circuit board 50 for controlling the operation of light emitters 24. The bottom of housing 14 being adapted with a battery compartment 52. A power activation switch and frequency control knob 82 is shown extending from circuit board 50 for controlling the operation and frequency of light emitters 24. A pair of detent structures 84, 86 are shown extending from housing 14 for engaging the periphery of control knob 82, thereby providing tactile feedback and stop limits on the positioning of control knob 82.

FIG. 7 depicts base 12 which is attached to the underside of housing 14 by any convenient means, although adhesive attachment is preferred. The base provides a non-slip, non-marring surface upon which the unit rests during storage and use. Battery retention is provided as batteries 54 are received through an opening in base 12 into compartment 52 (FIG. 6) of housing 14. A battery compartment door 56 secures the batteries within compartment 52. Batteries 54 typically last approximately six months with a workload of approximately ten demonstrations per day. It is preferred that the batteries 54 be replaced prior to the end of their useful lives so that the device does not cease to function during a demonstration to a patient.

FIG. 8 through FIG. 9D exemplify circuitry for controlling the activation and frequency of light emitting elements 24. In general terms, the circuitry carried by circuit board 50 comprises an oscillator controlling the operation of switching devices for strobing power to light emitters 24 at a predetermined frequency. It should be appreciated that an oscillator device may be selected which provides sufficient output current to drive light emitters 24 without the need of an external switching element.

Preferably, the strobe frequency can be adjusted within a range of approximately 1.0 Hz to approximately 200 KHz. The preferred embodiment is configured with two ranges to facilitate adjustment of the strobes within a low range for use with slower, typically mechanically driven toothbrushes, and a high range for use with toothbrushes that incorporate ultrasonics.

The first range is preferably a low frequency range spanning from approximately 11 KHz to approximately 17 KHz, while a second range is preferably a high frequency range spanning from 25 KHz to approximately 35 KHz, or higher. The low frequency range 84 provides frequency selections for demonstrating mechanically driven electric toothbrushes, which may have a head that moves in circles, or up and down, or in other directions. The brush head on these low frequency electric toothbrushes is generally mechanically driven by a motor and gearing. One of the better examples of such mechanically driven toothbrushes is the Oral B® toothbrush which provides a circular head that rotates about a central pivot. These toothbrushes generally operate at frequencies between about 12 KHz to 16 KHz.

The second range is preferably a high frequency range, as provided within the present embodiment, which facilitate demonstrating electric toothbrushes being driven at high ultrasonic frequencies. A typical example of an ultrasonic toothbrush is the Sonicare® toothbrush having a head that oscillates up and down at approximately 31 KHz. Head motion within the Sonicare toothbrush occurs in response to modulating the field intensity of two electromagnets within the handle, the fields of the electromagnets being coupled through the plastic of the toothbrush housing to permanent magnets which are mounted to a metallic energy transfer structure at the base of the head to create twisting moments in response to magnetic field modulation.

In the preferred embodiment, the apparatus includes frequency control 82 which preferably functions as an on-off switch as well as dual range frequency control. Once the apparatus is powered on by rotating control 82 in the clockwise direction, light emitters 24 commence strobing. The pulse frequencies of light emitters 24 may be increased by further adjustment of control 82, herein being clockwise rotation, until the approximate center of the rotational range is reached. At that point, a second higher range of frequencies are entered. The dual ranges are particularly well suited for comparing and contrasting use and performance aspects of high speed toothbrushes in relation to the less beneficial lower speed toothbrushes. The dual ranges may be implemented by using a conventional switch and potentiometer combination wherein the resistive element within the potentiometer is manufactured to have two selectable resistance ranges.

FIG. 9A through FIG. 9D illustrate the operation of the combination on/off switch and potentiometer wherein knurled edges of control 82 are shown being engaged within detent structures 84, 86. FIG. 9A illustrates an off position, with successive views showing movement through the two frequency ranges toward an end stop in FIG. 9D. Alternatively, a single continuous range potentiometer may be utilized instead of the dual range control, however, the unit may be subject to reduced selectivity when the high and low ranges are combined. Furthermore, the strobe frequency may be adjusted using any convenient form of control input, such as switches, dials, sliders, and so forth, without departing from the teachings of the present invention.

It should be noted that aliasing may occur when adjusting strobe frequency for different toothbrush models. Aliasing occurs when the perceived frequency at which the motion of the brush head is "frozen" in the strobe light is actually a harmonic or subharmonic of the operating frequency of the brush head.

It will be appreciated that the unit as shown in FIG. 1 through FIG. 9D may optionally incorporate additional features. For example a small readout may be incorporated for displaying strobe light frequency, such as a digital display (i.e. LCD, LED, or electronic ink display preferably displaying three digits) upon which the frequency of the strobe output may be displayed. Other options may also be incorporated within the unit, such as a sensor element that allows the frequency of the toothbrush to be directly registered. For example a simple piezoelectric strip when in contact with an oscillating head can generate a corresponding electrical output which may be registered and displayed. These options may be utilized in conjunction with or less preferably as an alternative to the use of the strobe lights.

In other alternative embodiments, the color of the light produced by the light emitters may be selected from a variety of colors including ultraviolet light that may provide illumination for the fluorescent paint that may be optionally utilized to represent plaque on the simulated dental surfaces. Similarly, the color of the gums 60 of tooth and gum assembly 58 may be selected to enhance the contrast between the liquid 74 and the gum 60 for clearer observation of the actions of liquid 72 in response to the electric toothbrush 74.

The above, and numerous other embodiments of instructive aids may be implemented similarly to the above described tooth brushing demonstration unit. Each of these units is preferably self contained and generally comprises a housing and a protective lid beneath which a dental structure is depicted for illustrating a dental procedure or situation. The functions provided by the unit may be active, requiring lighting effects or other electronics, or may perform the desired function statically, or the operation of the unit may be facilitated by interchanging elements. Active units may be adapted with internal or external power sources, wherein the activity is initiated and/or controlled using a set of electrical control inputs, such as an on/off switch or similar control, or automatically, such as upon opening the lid of the unit.

The housing is preferably constructed having a base to which an enclosure is attached. The colors of the housing and lid are preferably chosen to suit the particular embodiment. Although embodiments of the present invention are shown contained within an attractive oval housing with a domed lid, it should be appreciated that other shapes and configurations of the invention may be implemented without departing from the present teachings.

The power source preferably comprises conventional battery power which is inexpensive to manufacture and does not require chargers or other external equipment. It is contemplated that a typical light strobing demo would span from approximately 10 to 30 seconds duration. If powered from batteries and utilized to perform approximately 10 demonstrations per day the resultant battery life would be approximately six months.

It should be appreciated, however, that other sources of power may be similarly utilized for supplying power to the pod units, such as AC adapters, solar power, fuel cells, externally charged secondary batteries, capacitors, and so forth. If power is supplied by a secondary (rechargeable) internal power source (i.e. a battery or capacitor), then a charger comprising a conventional wired charger, an inductively coupled charger, or other similar external power source, would be power coupled to the internal power source within the unit.

Furthermore, in view of the limited duration of device usage, the power source may be readily configured for being powered by a super-capacitor, such as a dual layer capacitor, which may be rapidly charged at the time of use. For example, the charger may be inductively coupled to the unit, wherein charge current is induced in an inductive loop retained in the base of the unit when placed over a small inductive loop charge station. Utilizing a super-capacitor as a power source allows both trickle charging (charge maintenance), or super-rapid charging within a few seconds, such as at the time of use. Using this point of use rapid charging would eliminate any battery maintenance overhead so that a large family of pod units could be easily supported. The preceding examples serve to illustrate that a number of alternatives exist for powering these demonstration pod units.

Embodiments of the invention may include various lighting effects which may be created using any convenient form of lighting. The use of LED light sources is generally preferred due to their long service life, ease of manufacture, and energy efficiency.

The dental demonstration units of the invention may optionally be adapted to include at least one magnifying means for enhancing the visibility of the procedure or situation being depicted. Magnification is particularly well suited for demonstrating procedures such as drilling root-canals wherein the procedure acts upon only a small portion of the represented dental structure. By way of example, the magnifier may be implemented as a dome shaped snap-on magnifier for viewing the tip of the hand piece during operation. The magnifier may optionally be integrated, or adapted, for attachment with the bracket around the base of the teeth. A magnifier may be combined with the unit in a number of alternative ways without departing from the present invention.

Figure 10:
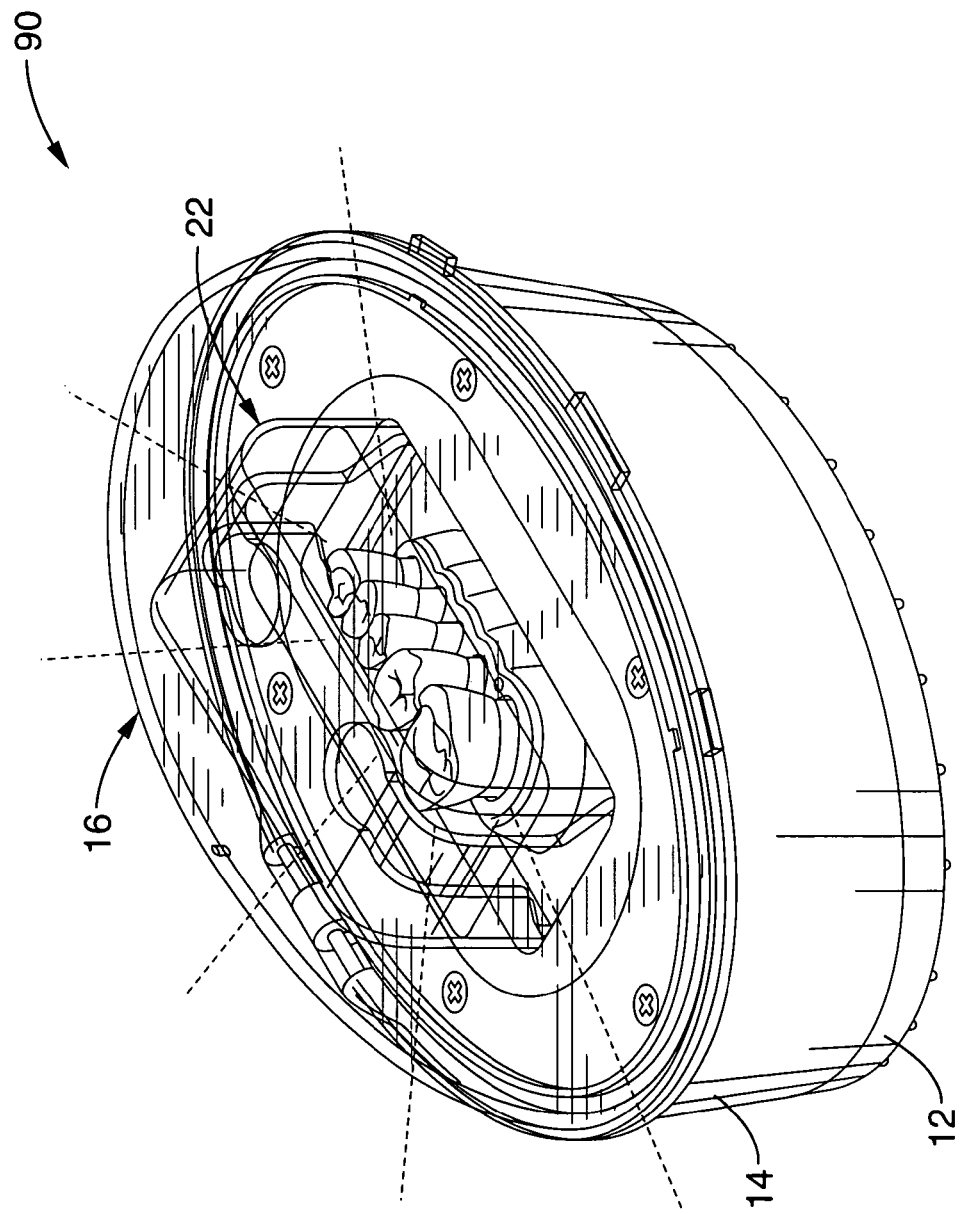
FIG. 10 is an assembled view of another Sonipod embodiment according to the present invention shown with the exterior lighting of FIG. 1 replaced with interior lighting.

FIG. 10 depicts a similar embodiment 90 of the toothbrush demonstration unit which illustrates brush head oscillation represented as cavitation, swirling, foaming and so forth. The unit preferably also provides stroboscopic lighting directed through transparent, or semi-transparent portions of the dental structures and preferably the surrounding portion thereof. The lighting within this embodiment of the unit is directed up from the housing through the dental structures and surrounding liquid, in contrast to being directed away from the exterior of the housing. Preferably this lighting effect is achieved by directing a light source retained within the housing up through the center section of housing 14 preferably configured with transparent regions and/or simulated dental structures that are fabricated from, or include, transparent material.

The cavitation at a given oscillation frequency can be readily discerned when light from the strobe light is directed up through the dental structure and surrounding liquid. This form of demonstration unit is generally referred to herein as a "Sonipod II". The outwardly directed exterior lighting of the embodiment described in FIG. 1 is preferably eliminated in deference herein to the use of interior lighting. An identical housing structure may be utilized within this embodiment, however, the light mounting holes are preferably filled, such as by installing a hole filling insert. Lighting of the simulated dental structure may alternatively be achieved by directing light from the top, or sides, of the housing toward chambered tooth assembly 22.

Figure 11:
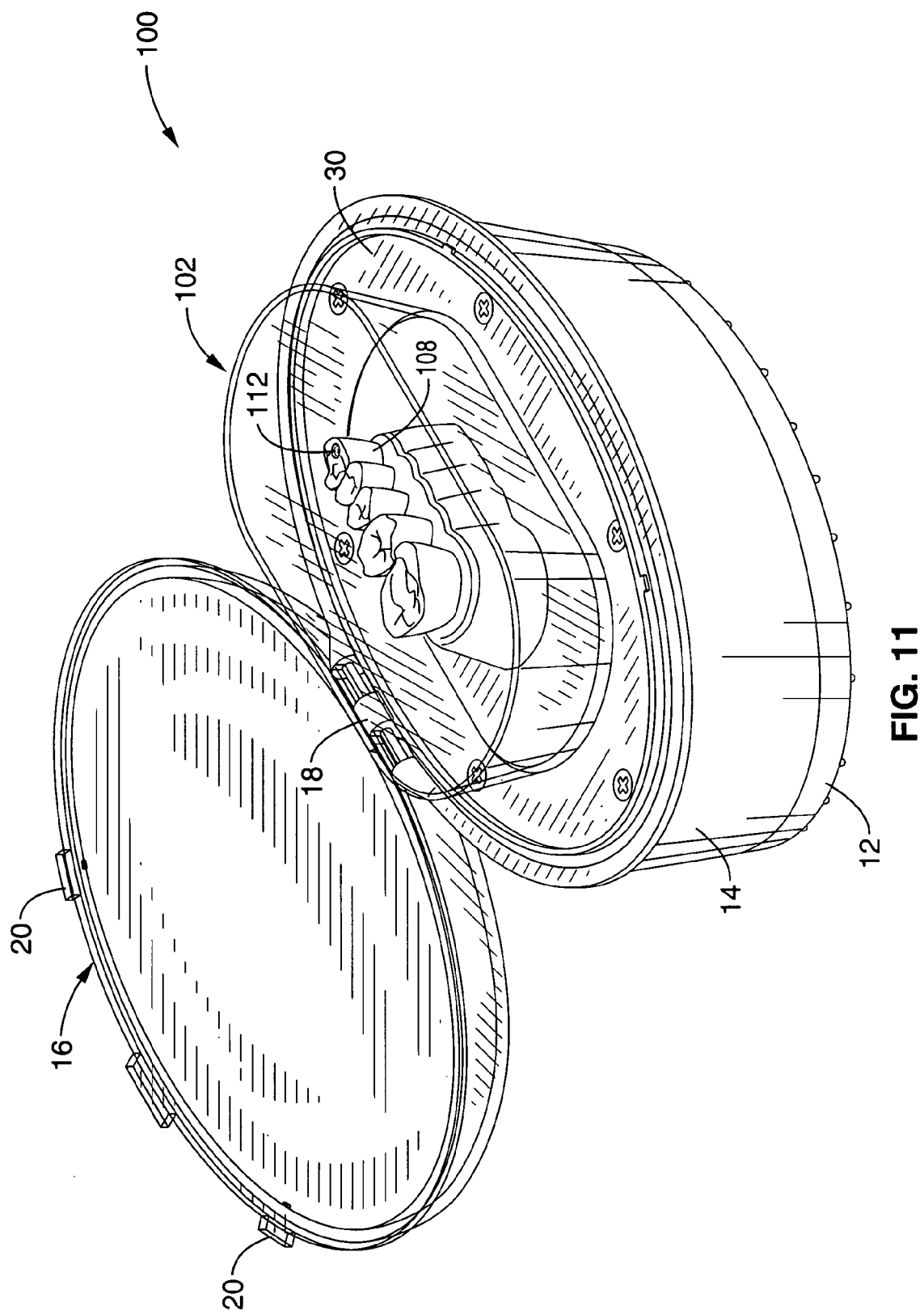
FIG. 11 is an assembled view of a unit configured for demonstrating cavity drilling and filling on a simulated dental structure according to an aspect of the present invention.

FIG. 11 is a cavity demonstration unit 100, or pod, having simulated dental structures 102 within an open container fluid reservoir 104. The fluid reservoir is adapted to facilitate easy waterproof cleanup, while the periphery of the fluid reservoir preferably comprises a flexible material. The unit is generally referred to herein as a "Cavipod". The dental structures 102 preferably comprise a section 106 to represent the gums into which simulated teeth structures 108 are inserted.

The unit allows representation of cavities and demonstrating cavity drilling and filling. Dental sections 102, or individual teeth, are preferably removable wherein different teeth, or sets of teeth, may be inserted to demonstrate different cavity situations. By way of example, simulated dental sections 102 may be adapted for retention within simulated gums 104, such as being "snap-fit" within the housing. Replacement simulated teeth should be made available for dentists utilizing the Cavipod. It is contemplated that kits will be made available in association with the Cavipod unit which include numerous sets of simulated teeth. The teeth for use within the unit may be preconfigured with calculus painted on them at a variety of locations to simulate cavities. Replacement teeth for use with the unit may be preferably obtained in sets, such as in gross quantities.

Preferably, the simulated dental structures 102 include a representation of one or more cavities 112. One method of representing the cavities is as holes in the surface of one or more teeth, the visibility of which may be enhanced by painting a calculus within the cavity. A second more preferred method of representing the cavities involves just painting, or marking, a calculus on the teeth to represent the cavity. The calculus may comprise any form of mark including inks, dies, and paints. Furthermore, phosphorescent materials may be utilized in conjunction with the calculus so that it will light up when exposed to ultraviolet light. The dental structures may be supplied with preapplied calculus, or the practitioner may apply the calculus themselves wherein they can represent both the procedure and the location and size of the cavity being drilled and filled.

Exterior or interior lighting directed may provide illumination of a simulated cavity. The lighting can preferably be adjusted for an oscillation frequency that corresponds with a hand piece operating at a speed of from approximately 100,000 RPM to 200,000 RPM (i.e. 1.666 KHz to 3.333 KHz) or to otherwise coincide with the rotational frequency of the dental drill being used to remove the material in and about the area of the cavity. The unit may be provided with interior lighting that shines up through simulated dental structures 102 and the surrounding area, or exterior lighting that is directed toward the hand piece and dental structures 102. Multiple lighting sets may be provided, such as one for specifically illuminating tip motion, which for example may follow a figure eight motion. The Cavipod may optionally be adapted to include a magnifying means to enhance the visibility of the procedure.

The use of a phosphorescent paint, liquid or dye is contemplated, wherein the phosphorescent material will be contained within or will attach to the calculus to increase visibility in combination with an ultraviolet light source. Preferably the phosphorescent material may be rinsed off. For example, a dye may be applied as a pre-rinse, gel, prophy paste, or be otherwise dispensed during the demonstration.

Figure 12:
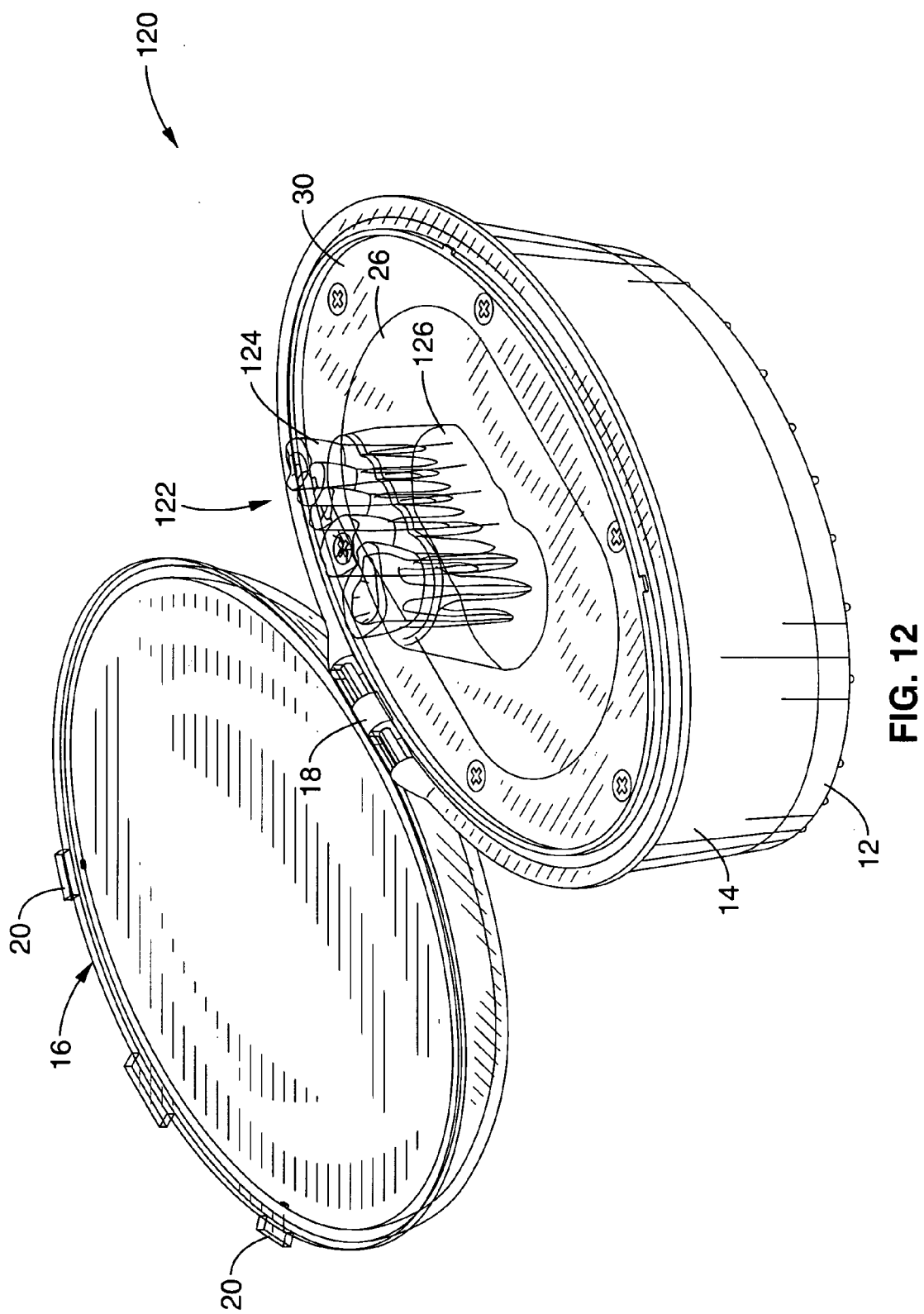
FIG. 12 is an assembled view of a unit configured for demonstrating endodontic situations and procedures, such as a root canal procedure, according to an aspect of the present invention.

FIG. 12 represents another demonstration unit 120, pod, for endodontic demonstrations. The unit 120 is shown with a set of simulated dental structures 122, including both the body of the teeth 124 and the roots 126. The gums may be shown as a clear material, or a removable opaque member, so that viewing of the tooth roots is not obscured by the simulated gums. The unit may be is generally referred to as an "Endopod".

The unit shown is particularly well suited for demonstrating a root canal procedure, wherein the soft core of the tooth, including pulp, nerves and blood vessels are removed and replaced by an inert material. Similar to the Cavipod, the unit is preferably lit with stroboscopic lighting effects to increase visibility of the bit being used within the hand piece. Lighting is preferably provided to allow the patient to clearly see aspects of the tooth, or teeth, and canals therein both before and during the procedure.

By way of example and not of limitation, a combination of exterior lighting and interior lighting is utilized within the preferred embodiment. Lighting may be strobed to aid in seeing the rotation of the hand pieces, such as at between 1 KHz to 20 KHz. A magnifier may be incorporated to increase the visibility of the root canal. Hand pieces utilized for root canals may operate from 1,000 RPM up to 500,000 RPM. The dental structures are preferably adapted with clear teeth and gums and the roots should be clearly visible. Optionally the roots may be configured with a simulated tooth root that has a soft or hollow core to facilitate centering the file within the hand piece when performing the root canal demonstration. A thin red trace may be molded within each portion of the root to simulate a vein traversing that portion of the root. With the hand piece file inserted within the tooth the strobing light allows the motion of the file to be readily viewed.

Figure 13:
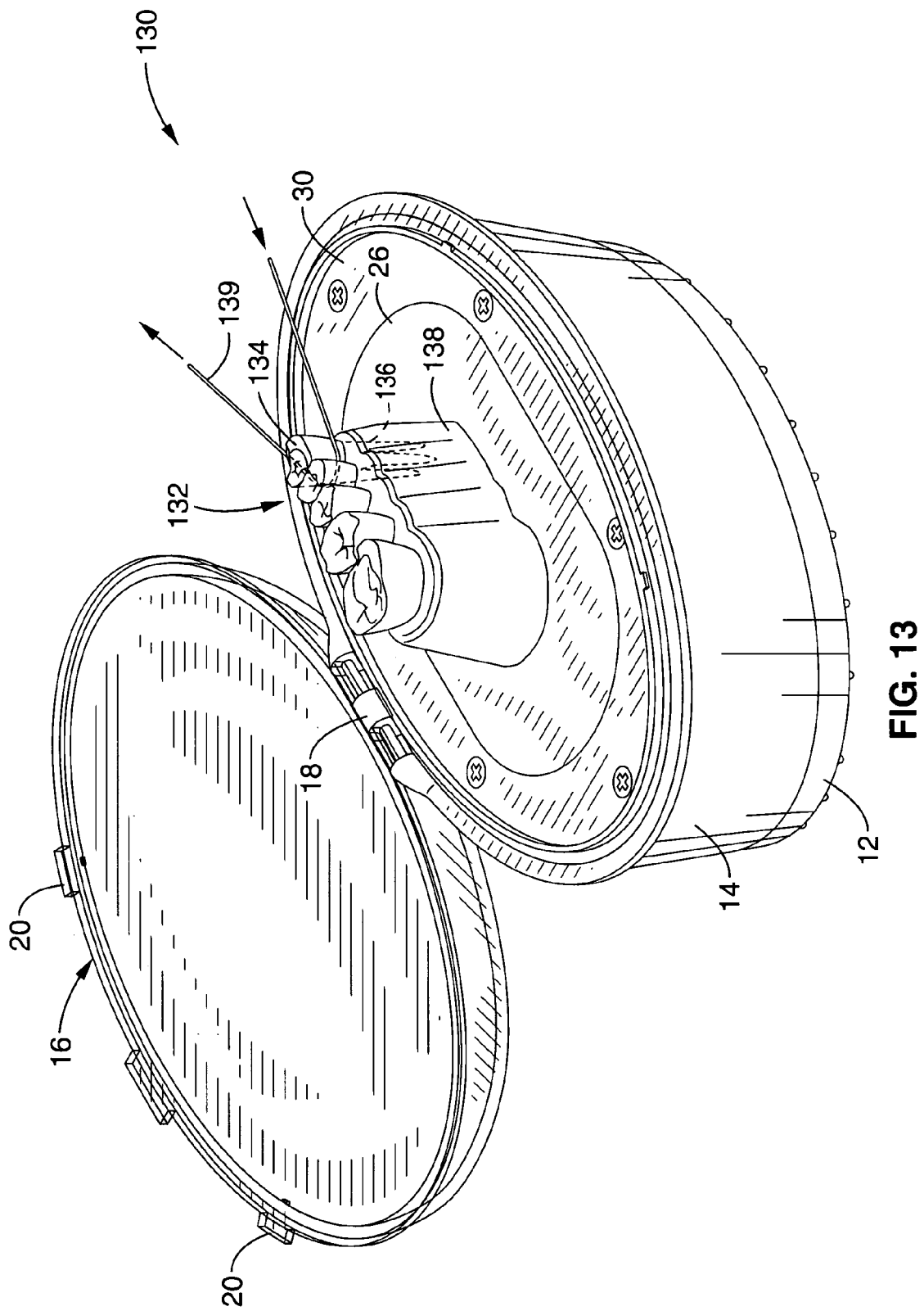
FIG. 13 is an assembled view of a unit configured for teaching about dental structures and demonstrating a variety of dental care procedures according to an aspect of the present invention.

FIG. 13 is a unit 130 for demonstrating general aspects of dental structures for educating patients about the dental structures and gums. This demonstration unit is generally referred to herein as an "Edupod". The Edupod preferably depicts a dental structure 132 with one or more teeth 134, including roots 136 and surrounding gums 138. Transparent teeth and gums may be utilized if underside lighting of the teeth and gums is to be provided. Teeth of various types may be inserted to demonstrate various aspects of dentistry. No liquid reservoir or chamber is required surrounding the dental structure. The gums may be represented transparently so that the roots may be viewed, or the gums may be represented using a transparent material, wherein the roots may be clearly seen. The teeth themselves may be depicted as structures in opaque, semi-transparent, or transparent material, which is largely dependent on whether lighting is provided within the unit and whether the lighting is directed to illuminate through the dental structures, or to provide external lighting.

Preferably, simulated dental structures 132 are fabricated as individual removable teeth so that aspects of different tooth structures may be addressed. The Edupod fitted with individual, or a dental structure 132 with separation between the tops 134 of the simulated teeth, allow the practitioner to demonstrate proper flossing techniques to patients, by actually working a section of dental floss 139 around the teeth and showing the patient how plaque is removed from the intedental spaces and curves of the teeth. Simulated plaque may even be dobbled in these areas and allowed to dry or cure, wherein the effects of proper flossing can be better illustrated by removing the dried material as flossing is performed. For example, the need to curve the floss around the tooth rather than retaining it orthogonal to the tooth surfaces when flossing. It should be appreciated, however, that flossing may also be effectively demonstrated on a number of the other demonstration pods described herein.

Figure 14:
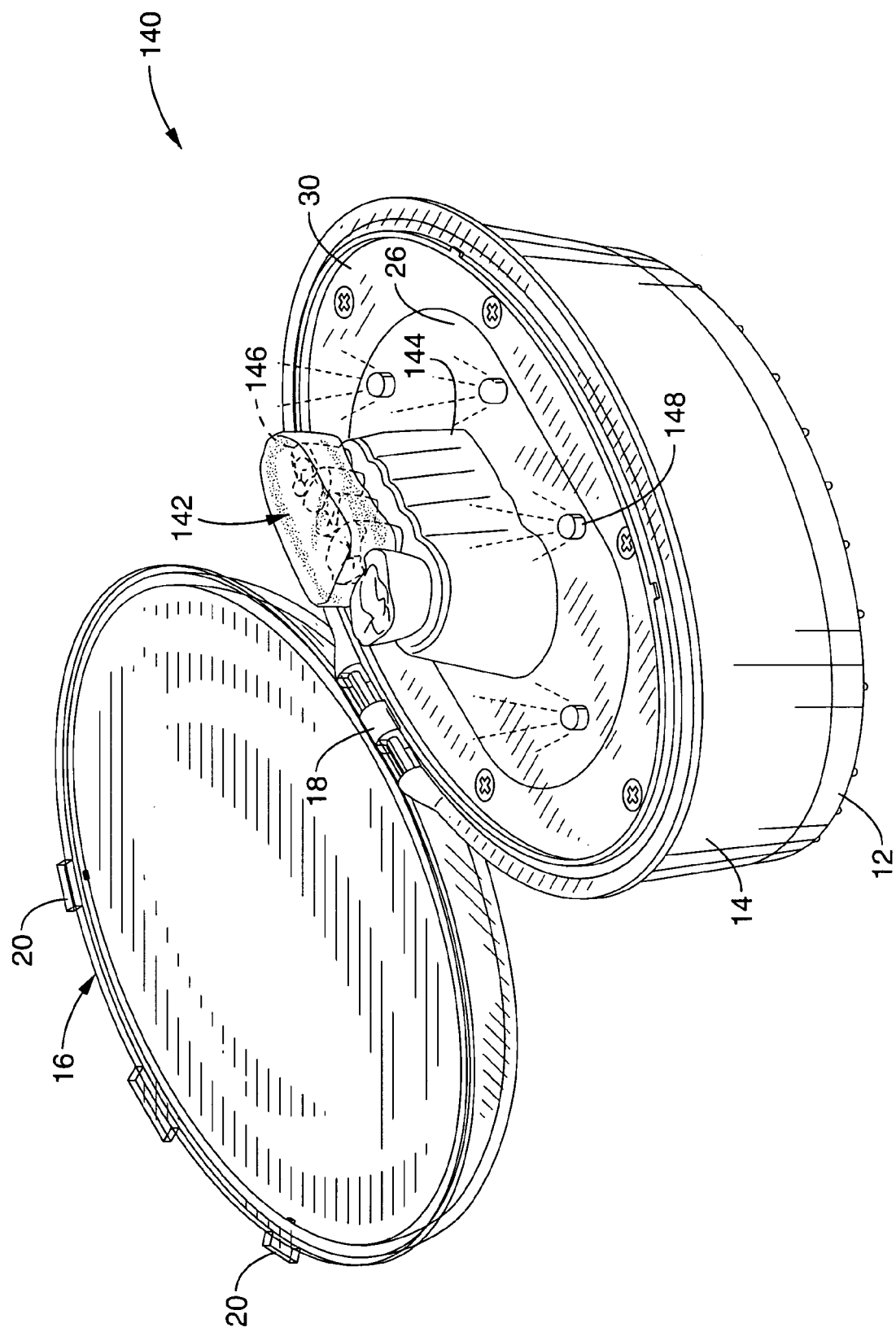
FIG. 14 is an assembled view of a unit configured for demonstrating the making of dental impressions upon a simulated dental structure according to an aspect of the present invention.

FIG. 14 is a unit 140 for demonstrating the application and curing of dental impressions. The unit is generally referred to herein as the "Curepod". A raised portion of a simulated dental structure 142 is shown surrounded by a simulated gum portion 144. Preferably a number of teeth are included within the dental structure, and optionally units may be configured to depict different portions of the bite, or the dental structures within the unit may be made removable, so that impressions may be illustrated over various dental areas. Impression material 146 may be placed over the dental structures and allowed to cure under ultraviolet light.

Albeit, it is preferable that the impression material and curing thereof be performed as a simulation, wherein actual curing, and the associated delays and cleanup, are not required. Preferably, a precast agglomeration of compliant material, such as cured impression material, is utilized as a removable impression casting. The dentist can place the precast piece over the teeth to simulate placing a clump of uncured impression gel material in the dental area. The unit may demonstrate an analogy of the type of lighting utilized for curing the impression material. Light sources 148, preferably multiple blue or violet LEDs, may be provided about the exterior for simulating the generation of ultraviolet lighting.

Figure 15:
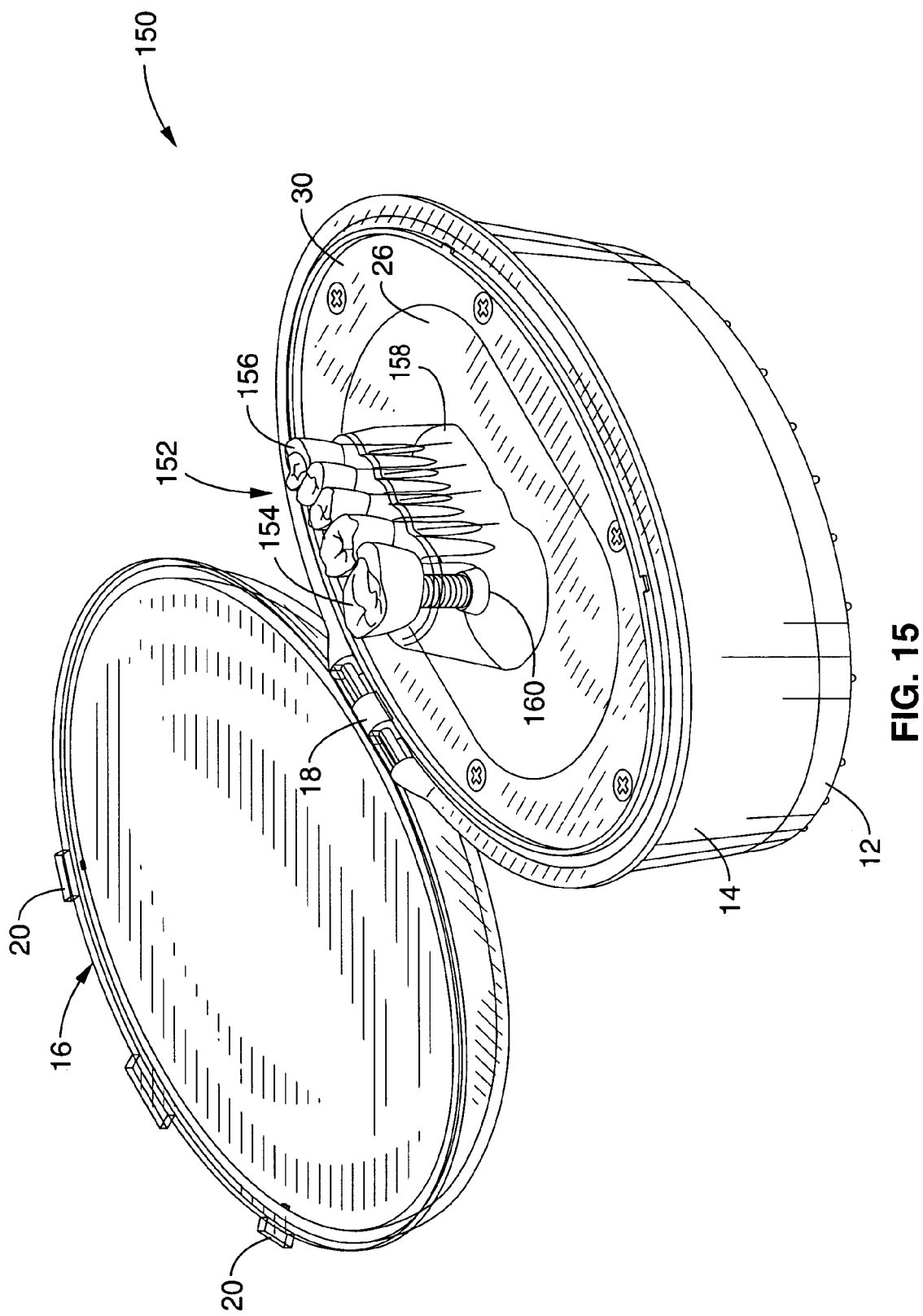
FIG. 15 is an assembled view of a unit configured for instructing patients about tooth implants and illustrating the steps involved in the dental implant procedure according to an aspect of the present invention.

FIG. 15 is a demonstration unit 150 for depicting tooth implants. The unit is generally referred to herein as an "Implantpod". The unit provides a modular system for illustrating implants and/or the implant process. Various stages of the implant process may be depicted on a single unit, or a series of modules utilized which collectively illustrate the implant process. The figure represents a set of dental structures 152, including a single tooth implant 154 which has been fully installed, amongst simulated natural teeth 156. Dental structures 152 are shown surrounded by gums 158, depicted as fabricated from a preferred transparent material so that the implanted base 160 of implant 154 may be clearly seen. The simulated implants may be illustrated with a cut-away or transparent section of simulated teeth including one or more implants.

It will be appreciated that approximately six steps are involved in the typical implant process. Consequently, from one to six pod units are preferably provided to illustrate the entire implantation process. The Implantpod unit may be alternatively implemented in a size larger than the other pod units to allow a full arch to be illustrated during the demonstration. Lighting is preferably provided within the modules as underside lighting in combination with transparent portions of the simulated dental structures and surrounding areas, such as gums, and external lighting.

Figure 16:
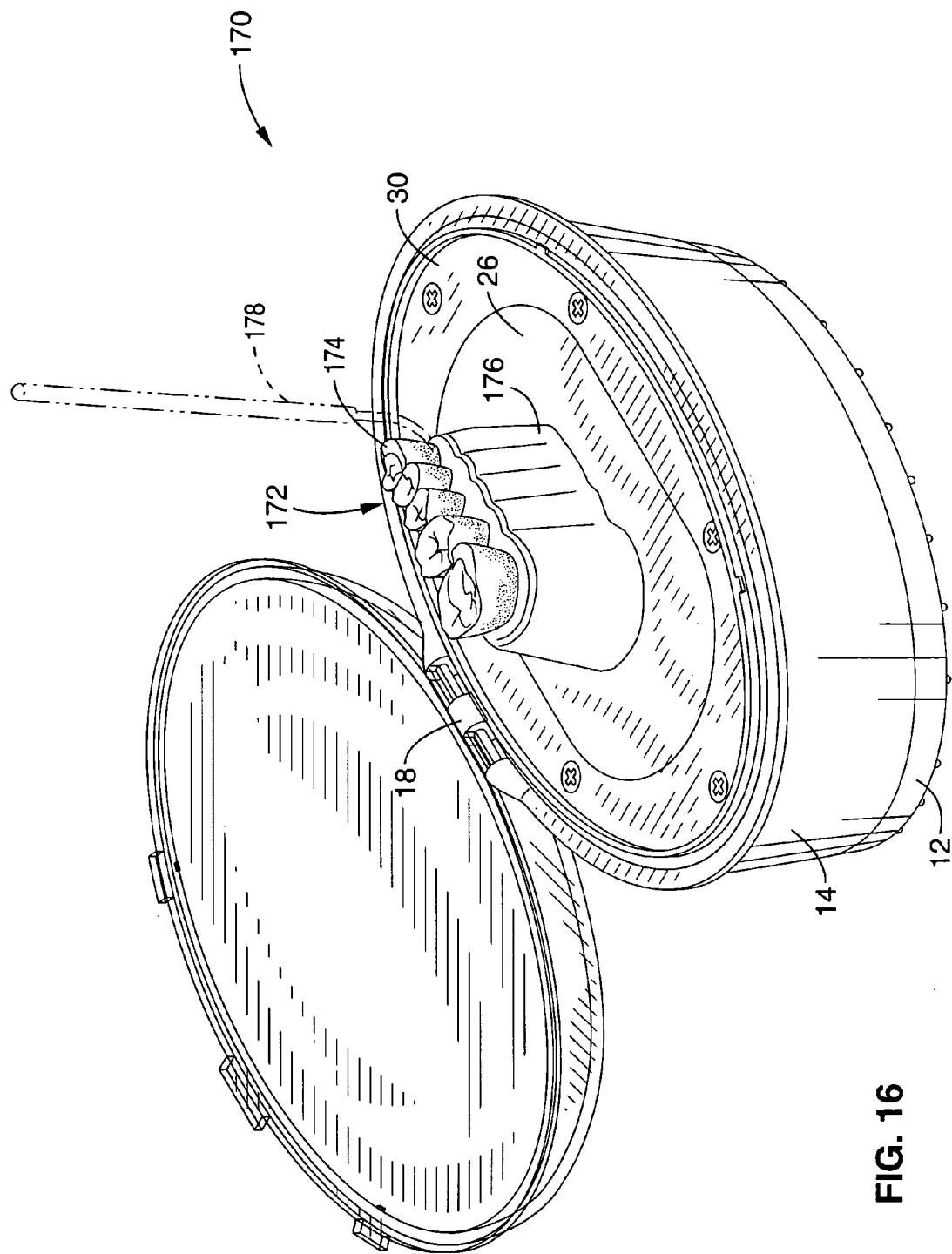
FIG. 16 is an assembled view of a unit configured for demonstrating dental prophylaxis, such as scraping and polishing, associated with a regular dental checkup described according to an aspect of the present invention.

FIG. 16 is a unit 170 that demonstrates cleaning calculus during regular scheduled prophylaxis, "cleaning visits", to the dentist. This unit is generally referred to herein as a "Phophypod". The unit demonstrates common procedures performed during practitioner teeth cleaning procedures. Dental structures 172 are shown comprising a set of teeth 174 surrounded by gums 176. A scraper 178 is shown demonstrating the actions that will be performed on the teeth during the cleaning operation. Preferably, simulated teeth are adorned with simulated plaque on the exterior of the dental structure to enhance the accuracy of the demonstration. The simulated plaque may be permanent or made removable.

By way of example, the dental practitioner may paint, or otherwise apply, a liquid simulated plaque material to portions of the teeth which after drying, or curing, may be removed during the demonstration while simulating performing a particular prophylaxis procedure. The simulated scraper may be utilized within the demonstration to show how the plaque is removed. The simulated plaque may comprise a white typing correction fluid to which an ink or similar colorant (i.e. brown and green) is added to enhance visibility. The simulated plaque liquid preferably dries or cures quickly to a solid material that is easily removed from the simulated dental structures. It will be appreciated that simulated scrapers may be provided for use with the demonstration unit wherein the plastic material of the simulated teeth is not then subjected to damage from the use of actual dental tools when performing each successive demonstration.

It is preferred within this embodiment of the invention that the simulated tooth structures be fabricated as individual teeth with slight gaps between each tooth to enhance realism. The teeth may also be removable, and/or replaceable, with teeth that illustrate different dental conditions. Providing teeth with slight gaps facilitates the demonstration of teeth scraping and polishing. Furthermore, the present embodiment so configured is very well suited for demonstrating proper flossing procedure as typically performed during a cleaning visit, and which is beneficially taught to each patient.

The dental structures may be implemented as transparent, semi-transparent, or opaque elements. Lighting may be provided which directs light through transparent portions or external lighting may direct light back towards the dental structures represented.

Figure 17:
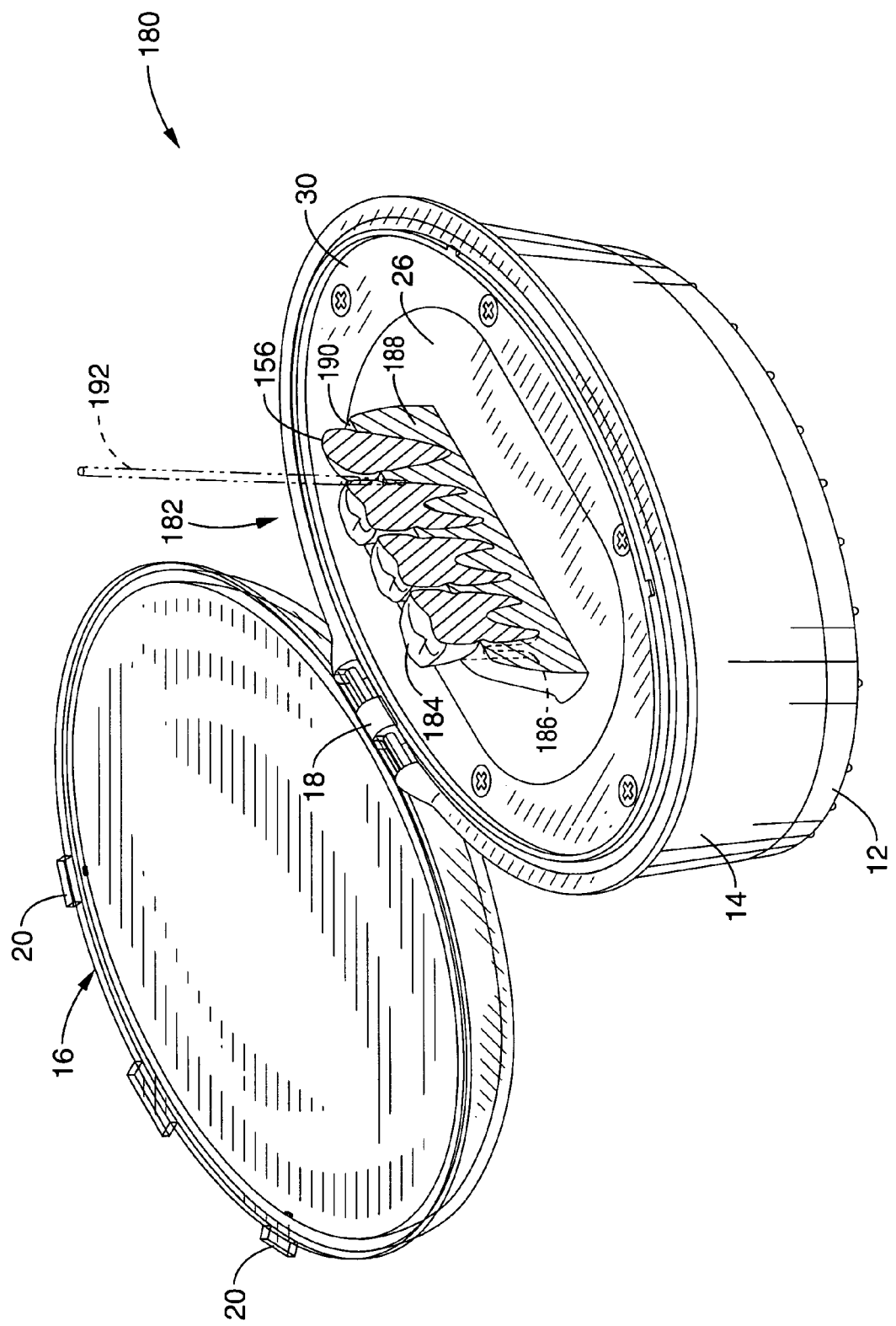
FIG. 17 is an assembled view of a unit configured for demonstrating tooth periodontal procedures, such as checking gum depth about the teeth, according to an aspect of the present invention.

FIG. 17 is a demonstration unit 180 upon which a number of periodontal procedures may be demonstrated. The unit is generally referred to herein as a "Periopod". It will be appreciated that periodontal procedures are those which pertain to the tissues that surround the neck and root of the teeth. A number of conventional periodontal procedures may be described utilizing the Periopod, such as charting, plaque and bleeding recordings, describing classifications of periodontal diseases, describing medical conditions affecting periodontal tissues, gingival recession, furcation involved teeth, and the use of hand instruments for periodontal care.

The unit depicts a cutaway view of a dental structure 182 comprising a set of simulated teeth 184 including roots 186, jaw 188, and surrounding gums 190. It will be appreciated that a conventional, non-cutaway, simulated dental structure may be alternatively utilized herein. Furthermore, all described embodiments of the dental structures described herein may be implemented alternatively implemented as a cutaway although not specifically shown in that configuration.

A depth checking tool 192 is shown demonstrating one of the common periodontal procedures for measuring the extent that gums have receded. The cutaway view allows the root of the teeth to be readily discerned along with checks and tests thereof. The gums 190, jaw 188, and teeth 184 may be fabricated from any desired material, such as from transparent, semi-transparent, or opaque materials. Typically, these dental structure can be manufactured in a low cost thermoplastic injection molding process, although any form of three dimensional fabrication technique may be utilized. In addition, the gum structures are preferably represented using a flexible material wherein procedures, such as checking recession, appear more realistic and easy for the patient to comprehend.

As with the other demonstration units, the periodontal demonstration unit preferably comprises a light emitter coupled through a power switch to a power source to enhance the visibility of the dental structures and any associated periodontal procedures. The light emitter may be provided within the housing and adapted to direct illumination up through transparent or semi-transparent portions of the dental structures or areas proximal to the dental structures, (i.e. simulated dental structures and simulated gums). Alternatively, or additionally, the light emitters may provide indirect lighting from the sides of the simulated dental structures.

Figure 18:
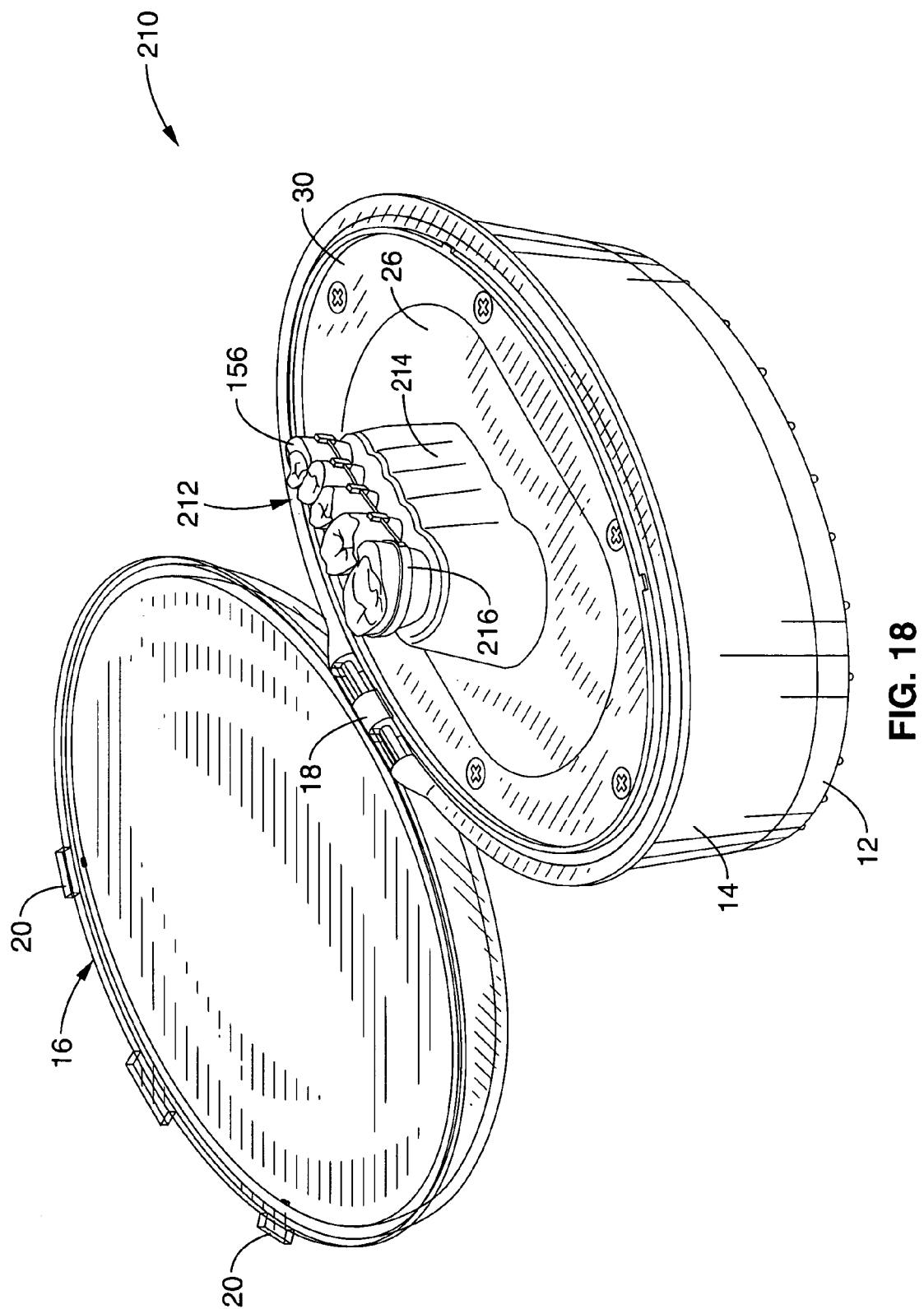
FIG. 18 is an assembled view of a unit configured for demonstrating orthodontic appliances and procedures according to an aspect of the present invention.

FIG. 18 is a demonstration unit 210 upon which orthodontic appliances and procedures are explained. The unit is generally referred to herein as an "Orthopod". The term orthodontic refers to that portion of dentistry pertaining to the prevention and correction of irregularities of the teeth, in particular the alignment of dental structures. The Orthopod unit allows demonstrating not only specific orthodontic appliances, but the procedures utilized for preparing the dental structures and installing orthodontic hardware, as well as patient procedures on how to use and care for their teeth and any associated appliances subject to orthodontic procedures.

The unit is shown exemplifying a set of teeth 212 with surrounding gums 214, which are shown interconnected by braces 216 for adjusting the orientation or alignment of the teeth. It will be appreciated that the embodiment shown is by way of example of a single style of Orthopod. It is contemplated that a separate Orthopod unit may be created for each orthodontic appliance, practitioner procedure, and patient care procedure.

The unit may additionally comprise light emitters utilized in a similar manner as other embodiments described herein, and is preferably provided with a self-contained power source, such as batteries.

Figure 19:
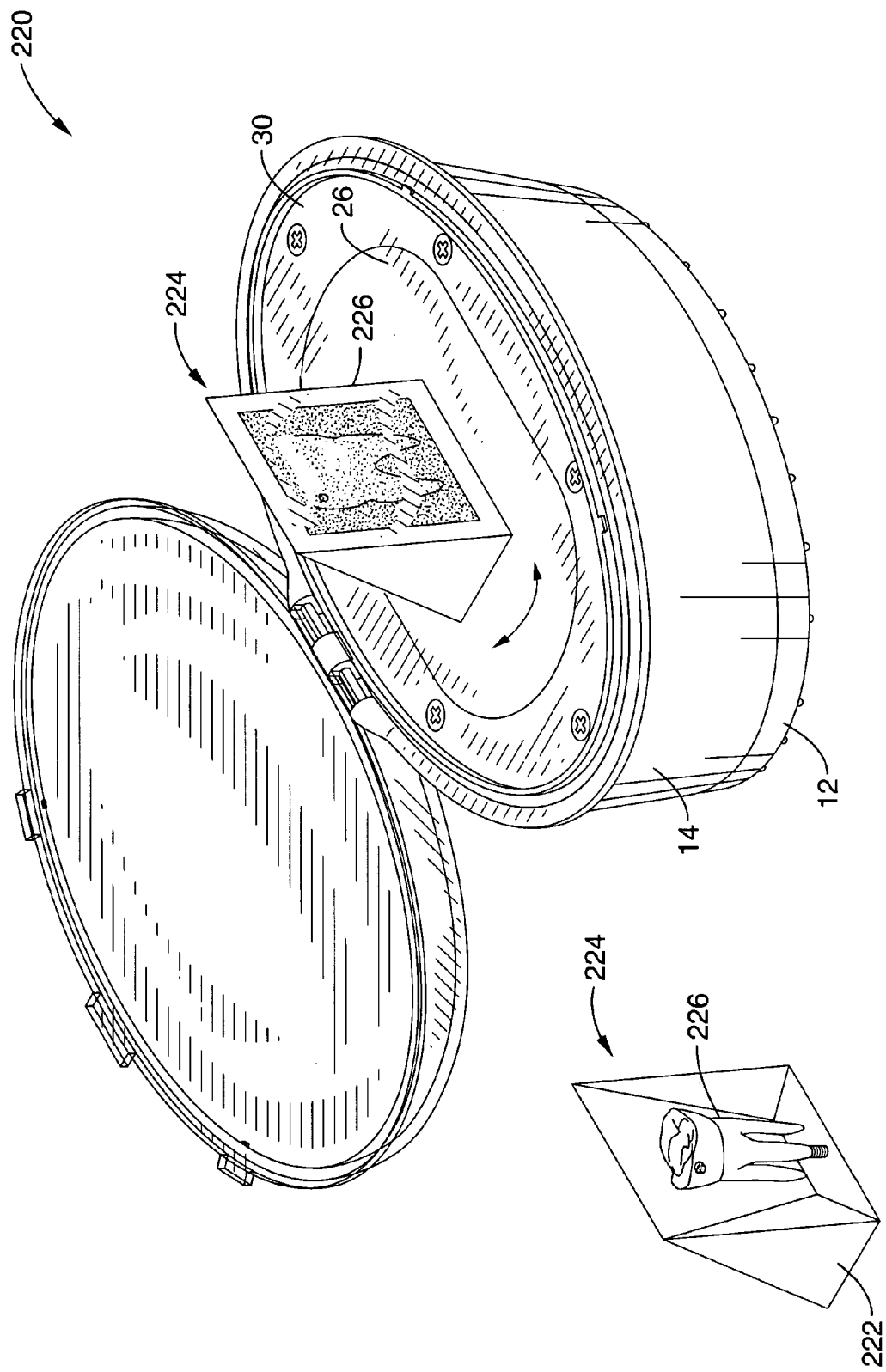
FIG. 19 is an assembled view of a unit configured for demonstrating the benefits of dental x-rays according to an aspect of the present invention.

FIG. 19 is a unit 220 for demonstrating the benefits of dental x-rays. The unit is generally referred to herein as a "Vupod". A display module 222 is shown attached to the top of the unit, preferably the display module is backlit from underneath and may be rotated. A first side of display module 222 comprises an x-ray image 224 on which one or more dental features can be discerned. The x-ray image 224 is retained by a backlit retention member for projecting light through the dental x-ray image.

Preferably, the opposing side of display module 222 may optionally contain a simulated tooth 226 upon which the conditions shown in x-ray 224 are depicted three dimensionally, including proper colorations and so forth. The simulated tooth may be optionally rotatable, hinged, or adapted to flex so that both sides of the tooth are generally accessible. For example the simulated tooth may simply be mounted by way of a compliant spring. As an alternative to retaining the x-ray and associated tooth on opposing sides of module 22, the x-ray and tooth may be shown adjacent to one another, and the opposing side of module 222 may be left blank or utilized to display another example containing both an x-ray and a simulated tooth.

FIG. 20 through FIG. 23 depict pod units which illustrate that the "pod" concept may be extended for providing other forms of demonstration or even play.

Figure 20:
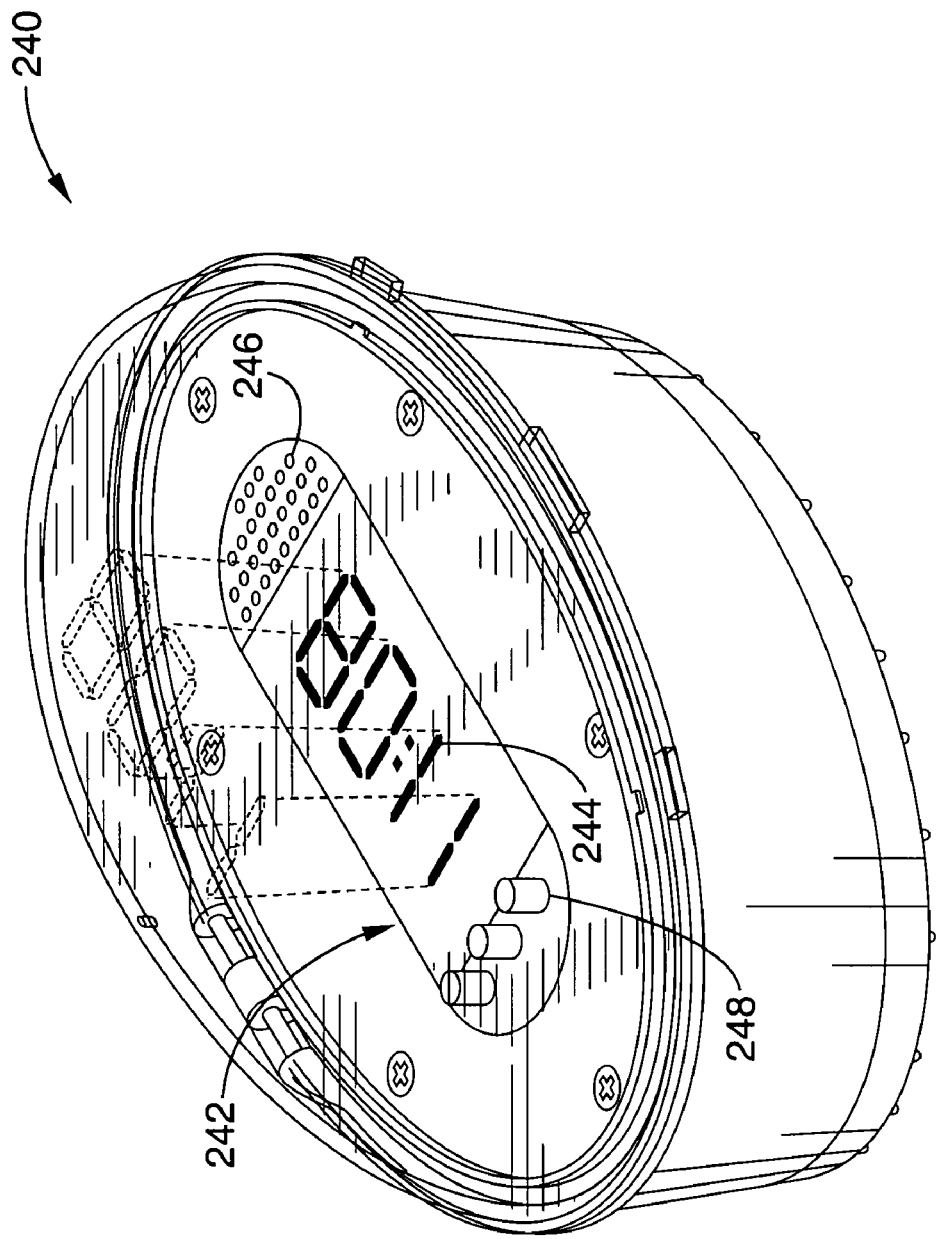
FIG. 20 is an assembled view of a unit configured as a toy providing a projecting clock according to an aspect of the present invention.

FIG. 20 is a unit 240, is referred to herein as a "Toypod", the one shown including a clock mechanism 242 capable of projecting the time onto the closed lid of the unit and of generating various music, sound effects and so forth which increase entertainment value. The sounds being preferably generated automatically in response to time values, although the sounds can be preferably manually activated. Users can preferably set the volume level for generated sounds and control whether or not sounds are to be generated automatically. The clock mechanism 242 is shown with a display 244 capable, for example, of projecting the displayed time onto the lid of the device. A speaker grill 246 is depicted through which generated sound effects and clock related sounds are played, and a set of controls 248 are shown for the clock and the generation of sound effects. The unit may be additionally provided with various additional lighting, timing, and sound effects that increase the value of the unit for entertainment and education.

A power switch, or display control switch, is preferably utilized for controlling the light output of the display device, to reduce power consumption when not in use. It will be appreciated, however, that power to the time clock circuit should be maintained.

Figure 21:
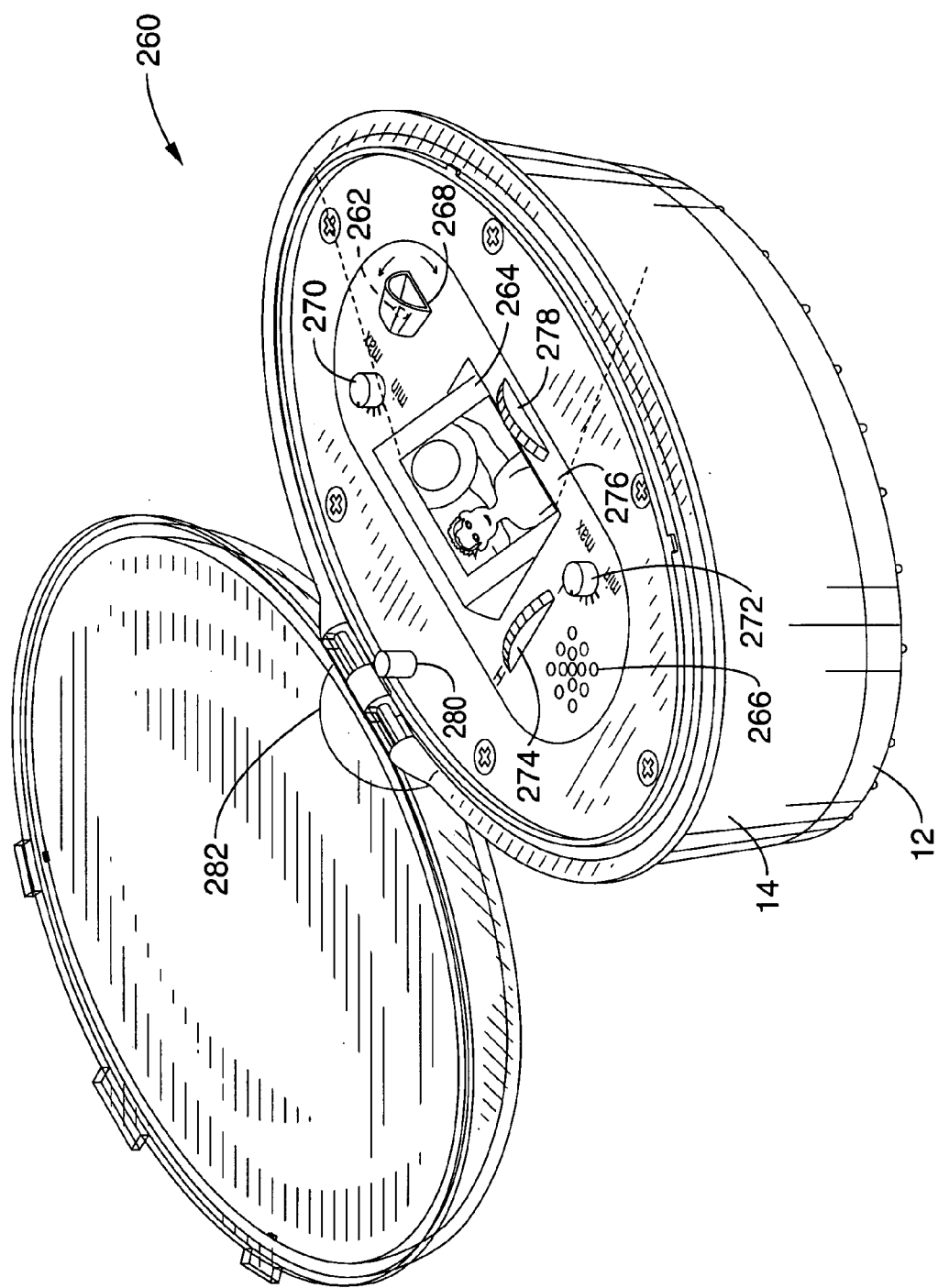
FIG. 21 is an assembled view of a unit configured for generating sights and sounds to calm crying babies according to an aspect of the present invention.

FIG. 21 is a pod unit 260 for entertaining babies, these pods are referred to herein as "Babypods". By way of example, these units provide an acoustic sensor which upon detecting a baby crying activates a projected scene(s) 264 and/or plays soothing music (i.e. lullaby), such as through an audio transducer coupled through speaker grill 266, which facilitate lulling the baby back to sleep.

Different pod units may be created for different scenes, different music, and so forth. Preferably, the lid of the pod units will be of different colors or be emblazoned with images which are indicative of the characteristics of a given Babypod, such as according to a particular set of characters (i.e. Barny®, Teletubbies®, or generic characters). An intense light source is placed behind one or more transparent images and the light passing through the image is then directed through one or more lenses for projection onto a wall or ceiling. The image(s) is preferably placed on a cartridge or other carrier, wherein the user may swap an image or group of images for display.

Babypod 260 is shown with additional optional features including a rotatable shroud 268 for directing the acoustic sensor toward the baby, so that the sensitivity to sounds made by the baby are increased while responses to ambient noises are decreased. A sensitivity adjustment 270 allows the threshold level for triggering the lights and music to be adjusted. A volume control 272 allows the amplitude of sound output to be adjusted, and may also incorporate an On/Off switch. A light intensity control 274 is shown as a scrolling wheel for adjusting the light output from the unit. The image output portion 276 of the display may be preferably swiveled for directing the light output toward an appropriate surface.

An image selection wheel 278 is preferably provided wherein different scenes may be selected for display. Image selectability may be readily implemented by connecting a series of images within a ring or polygonal structure which are adapted for retention around a combination illumination source and reflector for directing the light in a given direction, such as toward one or more lenses. The image selection wheel as provided in this figure allows for moving the image wheel (polygon) to select one of the images. It will be appreciated that alternative mechanisms exist for image selection, such as images inserted on cartridges and so forth. If the position of the image selector is electronically detected within the unit (i.e. by a mechanical switching device), then the music being played may be automatically selected by the circuitry within the pod unit in response to the scene selection. Furthermore, image selection changes may be performed automatically using an electromechanical actuator, wherein the unit may change images periodically, or based on acoustic stimulus, to aid in comforting and/or pacifying the child.

The Babypod is implemented with a power source coupled to a circuit through a power control switch. A means for registering acoustical energy, such as microphone, is utilized for registering audio events which are communicated with a detector circuit that generates an activation signal in response to the receipt of an event indicated by a sufficient acoustical amplitude. A timer circuit is provided that upon being triggered by said activation signal outputs a display activation signal for a predetermined period of time. By way of example and not of limitation, the timer circuit may be implemented as a separate circuit, integrated within an audio circuit, or included within the programming of a controller circuit.

A means for projecting an image on a nearby surface is incorporated within the housing which is activated by the display activation signal. The signals from the means for registering acoustical energy may be processed within a signal processing circuit prior to receipt within the detector circuit for qualifying or limiting the events to which the detector circuit is responsive. Audio may be stored in the memory of a controller or a separate memory cache for output through an audio transducer in response to being triggered, preferably in response to the amplitude and characteristics of the registered audio being detected. By way of example, the signal processing circuit may provide a frequency selective filtering of the acoustical energy being received, wherein certain characteristic sounds trigger activation at lower thresholds than other sound events, (i.e. high pitched sound of baby crying can trigger unit at a lower signal amplitude than for instance a truck rolling by nearby).

The frequency selective filtering attenuates frequencies not generally associated with the sounds produced by a crying baby. The signal processing circuit may additionally detect and process acoustical patterns, such as associated herein with a baby crying. These advanced forms of acoustic detection may be preferably implemented utilizing a low cost microcontroller executing simple digital signal processing routines, although low end DSP, or even neural net components may be less preferably utilized.

Music and/or other audio elements such as sound effects and voices may be stored within the unit for playback when operation is triggered, such as when image projection is activated. It will be appreciated that the sounds may be activated according to different thresholds or differing conditions in relation to the activation of image projection. For example, music may be activated at lower acoustic threshold settings, wherein the unit can provide a scaled response to the environment, and in particular to a crying child. The sounds may be stored by any convenient means and format, although it is preferably stored in a compact format, such as MIDI, MP3 or other sound storage format.

The unit may also be configured to allow users to individualize the sounds and/or images output from the Babypod unit. For example, a microphone may be operably coupled to a digital sound recording circuit within the Babypod wherein the user can record audio of their own voices for soothing the crying baby. Also a mechanism can be provided to allow parents to create their own transparent slide images for use within the unit, such as by outputting a photo to an inkjet printer which is printed on a transparency film and cut to fit within the housing of the apparatus for projection.

Another preferred embodiment of the Babypod may be created by incorporating the features of the Babypod unit described above with a radio transmitter configured for communicating with a remote receiver as an intercom operating as a baby monitor. A simple inexpensive transmitter module may be connected to the power source within the pod and controlled by the activation signals as described in relation with the image projection. It will be appreciated that baby monitors are exceedingly popular although they have certain limitations, which may be corrected by the present invention. Listening to an open-squelch communication channel wherein every little sound and motion is amplified is at least a distraction to parents and caregivers. The present invention of Babypod monitor, however, may be implemented to only activate the transmitter if the sound level, and/or characteristics of the sound, exceed a threshold or match a given set of characteristics. Furthermore, the unit may first generate the images and sounds as described herein to pacify the baby. If the crying sounds, or other selected trigger acoustic events, are still heard after a predetermined period of time, then the unit activates the transmitter to communicate the collected sounds to the remote location. It will be appreciated that other conditions may also be utilized for triggering the transmission of sounds to the remote location. When not transmitting audio over the RF channel, the unit preferably transmits an encoded keep-alive signal so that the remote unit can indicate that the communication channel is active, such as by means of an indicator light, while retaining its audio amplifier section in an inactive state in which no extraneous sounds are produced by the audio transducer within the receiver. The keep-alive signal is generated when acoustic activity is below threshold settings and it may be generated by a timing circuit or equivalent microcontroller firmware. The keep-alive signal is utilized for turning off the audio amplifier, or otherwise preventing audio generation at the remote receiver, and for triggering an indicator, such as an LED, that indicates to the parent that the communication channel is still active despite the lack of sound output.

An optional lid opening switch 280 is shown projecting from the interior surface of the unit which is configured to operate in combination with a tab 282. Upon extension of the plunger of switch 280 the switch enters the ON state to supply power to the unit. Alternatively, a separate power control may be utilized and the lid configured with a window or lens for directing the image for display against an object surface. It should be appreciated that this lid switch, or similar forms of activation controls, may be incorporated within any of the embodiments described according with the present invention.

A simple embodiment of image projection may alternatively be provided by retaining a transparent image slide within a retainer clip in the lid wherein light projected up from the base of the unit shines through the image slide and then passes through a lens as it is projected through the lid to a ceiling, wall, or other surface.

The Babypod, or elements therein, may also be configured for use as a Toypod, wherein the acoustic response to a baby crying can be replaced with another form of activation, such as a simple push-button switch, or other electrical activation trigger.

Figure 22:
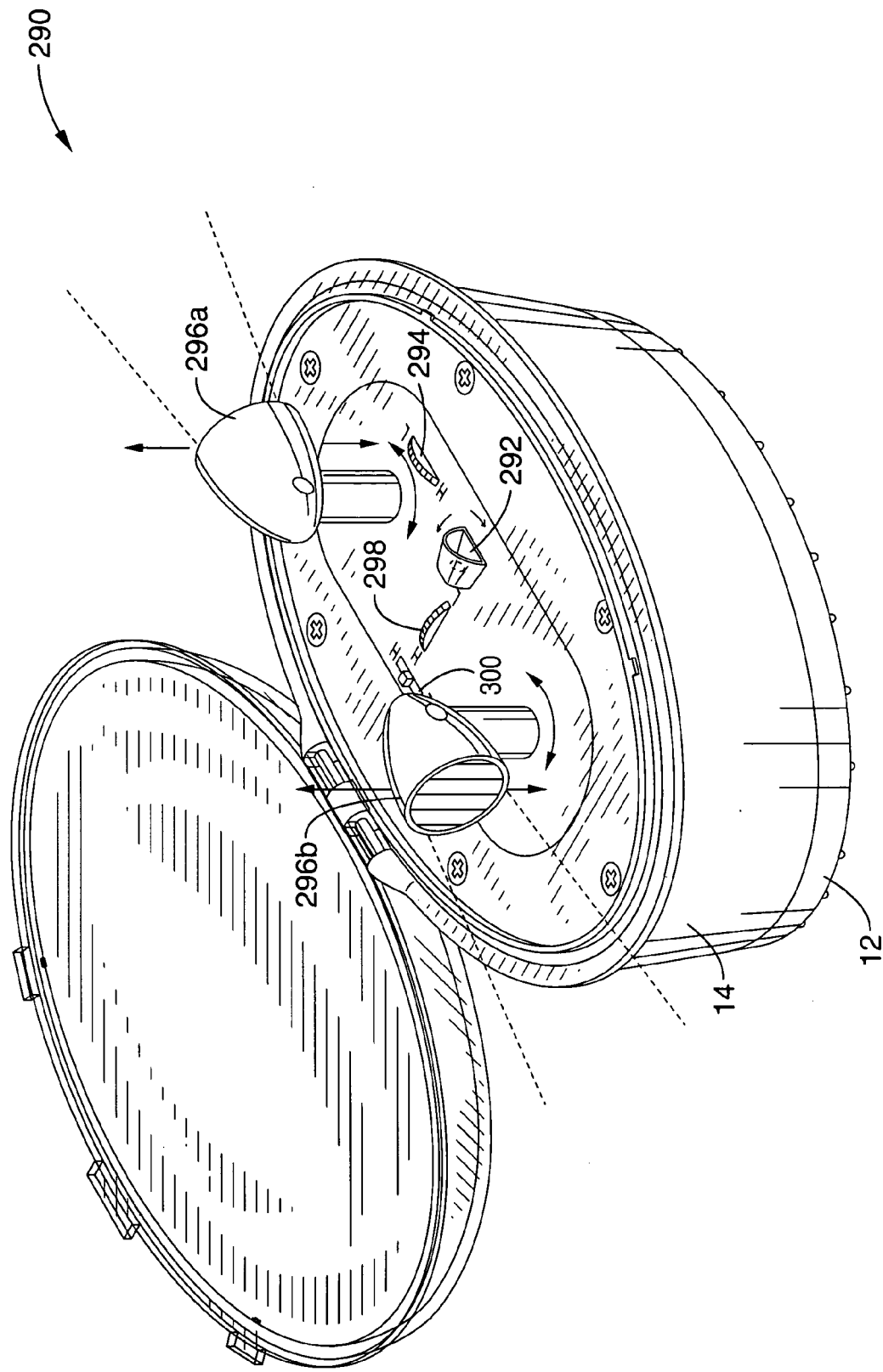
FIG. 22 is an assembled view of a unit configured for providing selective lighting at night according to an aspect of the present invention.

FIG. 22 is a unit 290 that provides a night light for children, and is referred to herein as a "Nitelitepod". The unit may be similarly adapted for being acoustically responsive to sounds, such as a general sound level, specific sound patterns, frequency distributions within a child's voice range, or voice recognition. In this way the unit may be triggered when the child calls out, wherein the light generated by the Nitelitepod is activated. A hooded microphone 292 is depicted that may be oriented toward the sleeping position of the child to increase selectivity of acoustic activation. The hood operates to attenuate any acoustical energy that is not aligned with the opening and direction of the movable hood, wherein acoustic sensitivity is increases to sound sources in a particular direction. A sensitivity control 294 is preferably provided, wherein the trigger threshold may be adjusted to prevent false activations.

The unit preferably includes a means for directing the path of the light, such as a reflector assembly surrounding a portion of the light emitter. By way of example the present embodiment provides two separate light beam assemblies 296a, 296b that may be independently rotated in a horizontal plane and adjusted angularly in a vertical plane. The preferred light sources are LED light sources, such as red, white or blue LED elements, which may comprise one or more elements housed within a reflector assembly and optionally directed through a lens element. Additionally, a light intensity adjustment 298 is preferably provided so that light intensity may be set for the particular situation and needs of the child (or adult). Once activated, the lights preferably remain active for a predetermined period of time. Duration of the light output is preferably controlled by a duration control 300, shown by way of example as a three-position slide switch such as providing selections of one minute, three minutes, and ten minutes.

It will be appreciated that operating a night light during the day, or when the area is otherwise sufficiently lit, is of little benefit while still consuming power. Therefore, the unit preferably is configured to detect ambient light levels, such as daylight or the presence of other room lighting, and to appropriately prevent unit activation. One simple method of registering ambient lighting is by measuring the bias current flowing through the illumination LEDs when they are utilized in an input mode (i.e. while light emitters are off, or by pulsing light emitters on and off when active and using off periods for registering ambient light intensity) and comparing this with an ambient lighting threshold. Alternatively, conventional optical sensors may be utilized for preventing unwarranted activation when sufficient light is otherwise available.

A benefit of providing adjustable direction light output is the ability to place the Nitelitepod in any convenient location while still lighting specific areas, such as a location near the bed or other area that could increase visibility or provide comfort. One typical lighting arrangement is that of lighting a path towards the bathroom wherein the child or person need not stumble around in the darkness. It will be appreciated that the unit may be configured for use by adults as well as children, as a number of accidents occur in the home when persons move about the house in the dark of night, such as to reach a bathroom. These problems are particular acute with children and the elderly. The present Nitelitepod can be activated when it registers a sufficient sound level, or specific types and characters of sounds (i.e. using simple acoustic filtering techniques and/or signal processing), wherein the light is generated for a predetermined amount of time. The acoustic detection within the Nitelitepod is preferably implemented in a similar manner as that described for the Babypod, however, it is adapted for projecting a lighting to provide comfort or enhance visibility, and may be acoustically triggered by a differing range and characteristics of nearby audio.

Figure 23:
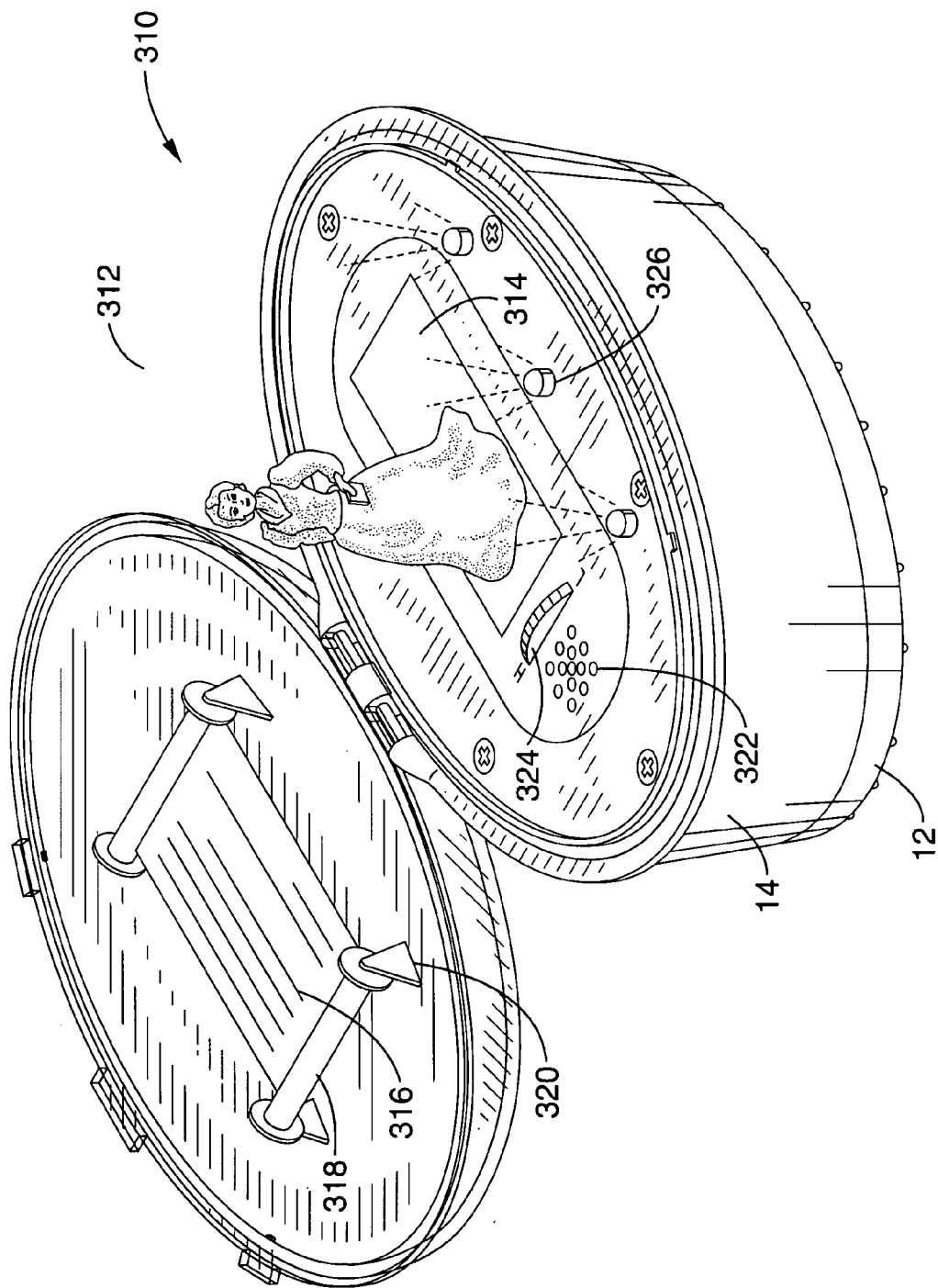
FIG. 23 is an assembled view of a unit configured for providing entertainment based on a character, action figure, or other three dimensional element according to an aspect of the present invention.

FIG. 23 is a unit 310 that entertains children by displaying characters 312. These characters may be generic characters wherein for example the unit is referred to as a "Characterpod" or illustrating known characters, such as Disney® characters wherein the unit may be known as a "Disneypod", or other trademarked character type. By way of example, each "pod" may be configured for a certain character 312, wherein as the lid is raised a model of the character raises from the box. The character is shown attached to a movable, preferably rotating, base 314 that is mechanically coupled to the lid mechanism for rotating the character vertically or horizontally in response to the lid being opened or closed. Alternatively, the character may be manually transitioned between the horizontal and vertical positions, wherein device cost is reduced.

Information about the character comprising a printed informational document, may be made available, such as on a booklet or stickers, or more preferably a scrolling biography 316, such as retained within the lid. Scroll 316 is shown with two roller 318 rotationally attached to retainers 320 attached within the lid of the unit. Character 312 may be accompanied by music which plays for a given duration after the lid is opened and then turns off automatically. A speaker grill 322 is shown through which sound from an audio transducer is directed. A volume control 324 is preferably provided to allow the user to modulate the amplitude of the sound effects and music being generated within the unit. Furthermore, lighting effects may be incorporated within the unit, such as a form of "stage lighting" 326 preferably utilizing one or more high efficiency LEDs that allow the character to be viewed even at night.

Alternatively, the units may be configured such that when the lid is opened a set of characters are displayed, and may move, such as in a carousel fashion and may be preferably accompanied by music associated with the characters.

Accordingly, it will be seen that this invention primarily provides demonstration pods for illustrating dental care situations and procedures. It is contemplated that these demonstration units can provide the necessary visual and manipulative dental illustrations prior to particular non-maintenance procedures, or as part of an ongoing program, or method, of educating patients about dental hygiene. For example, the proper techniques for using an electric toothbrush may be taught along with flossing, and other dental hygiene procedures. Patient education may be formalized wherein patient charts and dental records are adapted for recording which lessons the patient has received, and when. As proper dental hygiene training can lead to increased dental health and reduce the number of needed non-routine dental visits, an educational program utilizing the demonstration pods described herein may be made subject to practitioner reimbursement by insurance.

Non-dental embodiments of the present invention are also described for performing demonstrations and providing functionality directed at other purposes, such as exemplified by child care and toy applications.

Numerous embodiments have been provided to describe features of the "pod" units as directed to a number of applications. It should be appreciated that although each embodiment is generally shown with a specific set of structures and associated operational features, these structures and features can be utilized separately or in various combinations thereof for creating additional embodiments by one of ordinary skill in the art without departing from the teachings of the present invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for performing dental demonstrations, comprising:
    a housing;
    a simulated dental structure within said housing;
    means for demonstrating a function of an electric dental instrument on said simulated dental structure;
    a power source within said housing;
    at least one light emitter attached to said housing and configured to connect to said power source for illuminating a brush head of an electric toothbrush; and
    means for strobing said light emitter at a predetermined frequency.

2. An apparatus as recited in claim 1, further comprising a light within said housing for illuminating said dental structure.

3. An apparatus as recited in claim 1, wherein said means for strobing said light emitter comprises an oscillator circuit coupled to a switch through which power is directed from said power source to said light emitter.

4. An apparatus as recited in claim 1, further comprising:
    at least one light emitter attached to said housing and adapted for directing light toward said simulated dental structure, and configured to connect to said power source.

5. An apparatus as recited in claim 1, further comprising a lid adapted for attachment to said housing.

6. An apparatus as recited in claim 1, wherein said simulated dental structure comprises a simulated biting surface.

7. An apparatus as recited in claim 6, further comprising a simulated root extending from said simulated biting surface.

8. An apparatus as recited in claim 6, further comprising a simulated gum structure associated with said simulated dental structure.

9. An apparatus as recited in claim 8, wherein said simulated biting surface along with said simulated root are adapted for being insertably retained within said simulated gum structure.

10. An apparatus as recited in claim 6, wherein portions of said simulated dental structure comprises a transparent or semi-transparent material.

11. An apparatus as recited in claim 10, further comprising:
    a light emitter within said housing configured to illuminate said simulated dental structure; and
    a power source configured to supply electrical power to said light emitter.

12. An apparatus as recited in claim 6, further comprising:
    a chamber surrounding said biting surface; and
    a liquid partially filling said chamber.

13. An apparatus as recited in claim 12, wherein said liquid contains a coloring agent.

14. An apparatus as recited in claim 13, wherein said liquid comprises a liquid containing an anti-bacterial agent.

15. An apparatus as recited in claim 1, wherein said simulated dental structure comprises:
    a simulated biting surface including at least one simulated tooth, dental implant, or dental appliance; and
    a simulated gum structure surrounding said biting surface.

16. An apparatus as recited in claim 15, wherein said simulated dental structure comprises:
    a plurality of simulated teeth; and
    simulated gums surrounding said simulated teeth.

17. An apparatus for performing dental demonstrations, comprising:
    a housing;
    means coupled to said housing for demonstrating cavitation of a liquid in response to movement of an electric toothbrush head; and
    means coupled to said housing for generating light pulses to create a stroboscopic effect on a moving electric toothbrush head.

18. An apparatus as recited in claim 17, wherein said means for demonstrating cavitation comprises:
    a liquid filled chamber; and
    a simulated dental structure disposed within said liquid filled chamber.

19. An apparatus as recited in claim 18, wherein said liquid comprises mineral oil.

20. An apparatus as recited in claim 18, wherein said liquid comprises colored water and an anti-bacterial agent.

21. An apparatus as recited in claim 18, wherein said means for generating light pulses to create a stroboscopic effect on a moving electric toothbrush head comprises:
   a plurality of light emitters; and
   an oscillator circuit connected to said light emitters and configured to pulse said light emitters.

22. An apparatus as recited in claim 21, wherein said light emitters comprise a plurality of light emitting diodes.

23. An apparatus as recited in claim 21, wherein said oscillator circuit is configured to generate an oscillating light output from said light emitters within a range of approximately 1.0 Hz to approximately 200 KHz.

24. An apparatus as recited in claim 21, wherein said oscillator circuit further comprises a dual range frequency control having a first frequency range and a second frequency range.

25. An apparatus as recited in claim 24, wherein said first frequency range spans from approximately 11 KHz to approximately 17 KHz and said second frequency range spans from approximately 25 KHz to approximately 35 KHz.

26. An apparatus for performing dental demonstrations, comprising:
   a housing:
   a liquid filled chamber coupled to said housing;
   a simulated tooth and gum assembly positioned in said chamber; and
   means coupled to said housing for generating light pulses to create a stroboscopic effect on a moving electric toothbrush head placed adjacent to said liquid filled chamber.

27. An apparatus as recited in claim 26, wherein said means for generating light pulses to create a stroboscopic effect on a moving electric toothbrush head comprises:
   a plurality of light emitters; and
   an oscillator circuit connected to said light emitters and configured to pulse said light emitters.

28. An apparatus as recited in claim 27, wherein said light emitters comprise a plurality of light emitting diodes.

29. An apparatus as recited in claim 27, wherein said oscillator circuit is configured to generate oscillating light from said light emitters within a range of approximately 1.0 Hz to approximately 200 KHz.

30. An apparatus as recited in claim 27, wherein said oscillator circuit further comprises a dual range frequency control having a first frequency range and a second frequency range.

31. An apparatus as recited in claim 30, wherein said first frequency range spans from approximately 11 KHz to approximately 17 KHz and said second frequency range spans from approximately 25 KHz to approximately 35 KHz.

32. An apparatus as recited in claim 26, wherein said liquid comprises mineral oil.

33. An apparatus as recited in claim 26, wherein said liquid comprises colored water and an anti-bacterial agent.

34. An apparatus for performing dental demonstrations, comprising:
   a housing;
   means coupled to said housing for demonstrating cavitation of a liquid in response to movement of an electric toothbrush head;
   a plurality of light emitters coupled to said housing; and
   an oscillator circuit configured to send a pulsed signal to said light emitters and generate a strobed output from said light emitters.

35. An apparatus as recited in claim 34, wherein said light emitters comprise a plurality of light emitting diodes.

36. An apparatus as recited in claim 34, wherein said oscillator circuit is configured to generate a pulsed signal for driving said light emitters within a range of approximately 1.0 Hz to approximately 200 KHz.

37. An apparatus as recited in claim 34, said oscillator circuit further comprises a dual range frequency control having a first frequency range and a second frequency range.

38. An apparatus as recited in claim 37, wherein said first frequency range spans from approximately 11 KHz to approximately 17 KHz and said second frequency range spans from approximately 25 KHz to approximately 35 KHz.

39. An apparatus as recited in claim 34, wherein said means for demonstrating cavitation comprises:
   a liquid filled chamber; and
   a simulated tooth and gum assembly disposed within said liquid filled chamber.

40. An apparatus as recited in claim 39, wherein said liquid comprises mineral oil.

41. An apparatus as recited in claim 39, wherein said liquid comprises colored water and an anti-bacterial agent.

42. An apparatus for performing dental demonstrations, comprising:
   a housing;
   a liquid filled chamber coupled to said housing;
   a simulated tooth and gum assembly positioned in said chamber;
   a plurality of light emitters coupled to said housing; and
   an oscillator circuit connected to said light emitters and configured to pulse said light emitters stroboscopically.

43. An apparatus as recited in claim 42, wherein said light emitters comprise a plurality of light emitting diodes.

44. An apparatus as recited in claim 42, wherein said oscillator circuit is capable of generating an oscillating output signal to said light emitters within a range of approximately 1.0 Hz to approximately 200 KHz.

45. An apparatus as recited in claim 42, wherein said oscillator circuit further comprises a dual range frequency control having a first frequency range and a second frequency range.

46. An apparatus as recited in claim 45, wherein said first frequency range spans from approximately 11 KHz to approximately 17 KHz and said second frequency range spans from approximately 25 KHz to approximately 35 KHz.

47. An apparatus as recited in claim 42, wherein said liquid comprises mineral oil.

48. An apparatus as recited in claim 42, wherein said liquid comprises colored water and an anti-bacterial agent.

49. An apparatus for performing dental demonstrations, comprising:
   a housing;
   a simulated dental structure within said housing;
   means for demonstrating an aspect of a dental situation or procedure on said simulated dental structure;
   a light within said housing for illuminating said dental structures; and
   means for producing a stroboscopic effect from said light.

50. An apparatus for performing dental demonstrations, comprising:
a housing;
a simulated dental structure within said housing;
means for demonstrating an aspect of a dental situation or procedure on said simulated dental structure;
a power source within said housing;
at least one light emitter attached to said housing and configured to connect to said power source for illuminating the brush head of an electric toothbrush; and
means for strobing said light emitter at a predetermined frequency.

51. An apparatus as recited in claim 50, wherein said means for strobing of said light emitter comprises an oscillator circuit coupled to a switch through which power is directed from said power source to said light emitter.

52. An apparatus for performing dental demonstrations, comprising:
a housing;
a simulated dental structure within said housing;
means for demonstrating an aspect of a dental situation or procedure on said simulated dental structure;
at least one light emitter attached to said housing and adapted for directing light toward said simulated dental structure; and
a power source configured to supply operating power to said light emitter; and
means for producing a stroboscopic effect from said light emitter.

53. An apparatus for performing dental demonstrations, comprising:
a housing;
a simulated dental structure within said housing; and
means for demonstrating an aspect of a dental situation or procedure an said simulated dental structure; and
wherein said simulated dental structure comprises a simulated biting surface;
a light emitter within said housing configured to illuminate said simulated dental structure;
a power source configured to supply electrical power to said light emitter; and means for producing a stroboscopic effect from said light emitter.

54. An apparatus as recited in claim 53, further comprising a simulated root extending from said simulated biting surface.

55. An apparatus as recited in claim 53, further comprising a simulated gum structure associated with said simulated dental structure.

56. An apparatus as recited in claim 55, wherein said simulated biting surface along with said simulated root are adapted for being insertably retained within said simulated gum structure.

57. An apparatus as recited in claim 53, further comprising:
a chamber surrounding said biting surface; and
a liquid partially filling said chamber.

58. An apparatus as recited in claim 57, wherein said liquid contains a coloring agent.

59. An apparatus as recited in claim 58, wherein said liquid comprises a liquid containing an anti-bacterial agent.

60. An apparatus for performing dental demonstrations, comprising:
a housing;
a simulated dental structure within said housing;
means for demonstrating a function of an electric dental instrument on said simulated dental structure;
wherein said simulated dental structure comprises a simulated biting surface;
wherein portions of said simulated dental structure comprises a transparent or semi-transparent material;
a light emitter within said housing configured to illuminate said simulated dental structure;
a power source configured to supply electrical power to said light emitter; and
means for producing a stroboscopic effect from said light emitter.

61. An apparatus as recited in claim 60, further comprising a light within said housing for illuminating said dental structures.

62. An apparatus as recited in claim 60, wherein said means for producing a stroboscopic effect comprises an oscillator circuit coupled to a switch through which power is directed from said power source to said light emitter.

63. An apparatus as recited in claim 60, further comprising a lid adapted for attachment to said housing.

64. An apparatus as recited in claim 60, wherein said simulated dental structure comprises a simulated biting surface.

65. An apparatus as recited in claim 64, further comprising a simulated root extending from said simulated biting surface.

66. An apparatus as recited in claim 64, further comprising a simulated gum structure associated with said simulated dental structure.

67. An apparatus as recited in claim 66, wherein said simulated biting surface along with said simulated root are adapted for being insertably retained within said simulated gum structure.

68. An apparatus as recited in claim 64, further comprising:
a chamber surrounding said biting surface; and
a liquid partially filling said chamber.

69. An apparatus as recited in claim 68, wherein said liquid contains a coloring agent.

70. An apparatus as recited in claim 68, wherein said liquid comprises a liquid containing an anti-bacterial agent.

71. An apparatus as recited in claim 60, wherein said simulated dental structure comprises:
a simulated biting surface including at least one simulated tooth, dental implant, or dental appliance; and
a simulated gum structure surrounding said biting surface.

72. An apparatus as recited in claim 60, wherein said simulated dental structure comprises:
a plurality of simulated teeth; and
simulated gums surrounding said simulated teeth.

73. An apparatus for performing dental demonstrations, comprising:
a housing;
a simulated dental structure within said housing; and
means for demonstrating a function of an electric dental instrument on said simulated dental structure;
wherein said simulated dental structure comprises a simulated biting surface;
a chamber surrounding said biting surface; and
a liquid partially filling said chamber.

74. An apparatus as recited in claim 73, wherein said liquid contains a coloring agent.

75. An apparatus as recited in claim 73, wherein said liquid comprises a liquid containing an anti-bacterial agent.

76. An apparatus as recited in claim 73, further comprising a light within said housing for illuminating said dental structures.

77. An apparatus as recited in claim 73, further comprising:
- a power source within said housing; and
- at least one light emitter attached to said housing and configured to connect to said power source for illuminating the brush head of an electric toothbrush.

78. An apparatus as recited in claim 77, further comprising means for strobing said light emitter at a predetermined frequency.

79. An apparatus as recited in claim 78, wherein said means for strobing said light emitter comprises an oscillator circuit coupled to a switch through which power is directed from said power source to said light emitter.

80. An apparatus as recited in claim 73, further comprising:
- at least one light emitter attached to said housing and adapted for directing light toward said simulated dental structure; and
- a power source configured to supply operating power to said light emitter.

81. An apparatus as recited in claim 73, further comprising a lid adapted for attachment to said housing.

82. An apparatus as recited in claim 73, wherein said simulated dental structure comprises a simulated biting surface.

83. An apparatus as recited in claim 82, further comprising a simulated root extending from said simulated biting surface.

84. An apparatus as recited in claim 82, further comprising a simulated gum structure associated with said simulated dental structure.

85. An apparatus as recited in claim 84, wherein said simulated biting surface along with said simulated root are adapted for being insertably retained within said simulated gum structure.

86. An apparatus as recited in claim 82, wherein portions of said simulated dental structure comprises a transparent or semi-transparent material.

87. An apparatus as recited in claim 86, further comprising:
- a light emitter within said housing configured to illuminate said simulated dental structure; and
- a power source configured to supply electrical power to said light emitter.

88. An apparatus as recited in claim 87, further comprising means for producing a stroboscopic effect from said light emitter.

89. An apparatus as recited in claim 73, wherein said simulated dental structure comprises:
- a simulated biting surface including at least one simulated tooth, dental implant, or dental appliance; and
- a simulated gum structure surrounding said biting surface.

90. An apparatus as recited in claim 73, wherein said simulated dental structure comprises:
- a plurality of simulated teeth; and
- simulated gums surrounding said simulated teeth.

91. An apparatus for performing dental demonstrations, comprising:
- a housing;
- a simulated dental structure within said housing; and
- means for demonstrating an aspect of a dental situation or procedure on said simulated dental structure;
- wherein said simulated dental structure comprises a simulated biting surface;
- a chamber surrounding said biting surface; and
- a liquid partially filling said chamber.

92. An apparatus as recited in claim 91, wherein said liquid contains a coloring agent.

93. An apparatus as recited in claim 91, wherein said liquid comprises a liquid containing an antibacterial agent.

94. An apparatus as recited in claim 91, further comprising a simulated root extending from said simulated biting surface.

95. An apparatus as recited in claim 91, further comprising a simulated gum structure associated with said simulated dental structure.

96. An apparatus as recited in claim 95, wherein said simulated biting surface along with said simulated root are adapted for being insertably retained within said simulated gum structure.

97. An apparatus as recited in claim 91, wherein portions of said simulated dental structure comprises a transparent or semi-transparent material.

98. An apparatus as recited in claim 91, further comprising:
- a light emitter within said housing configured to illuminate said simulated dental structure; and
- a power source configured to supply electrical power to said light emitter.

99. An apparatus as recited in claim 98, further comprising means for producing a stroboscopic effect from said light emitter.

* * * * *